United States Patent [19]
Yamanashi

[11] Patent Number: 5,627,685
[45] Date of Patent: May 6, 1997

[54] TELEPHOTO LENS SYSTEM

[75] Inventor: Takanori Yamanashi, Kokubunji, Japan

[73] Assignee: Olympus Optical Co., Ltd., Tokyo, Japan

[21] Appl. No.: 432,716

[22] Filed: May 2, 1995

[30] Foreign Application Priority Data

May 2, 1994 [JP] Japan .................................. 6-093202

[51] Int. Cl.$^6$ .................................................. G02B 13/02
[52] U.S. Cl. .......................................... 359/745; 359/747
[58] Field of Search ................................ 359/745, 796, 359/747, 748

[56] References Cited

U.S. PATENT DOCUMENTS 4,966,449 10/1990 Maruyama ............................ 359/745

Primary Examiner—Scott J. Sugarman
Attorney, Agent, or Firm—Cushman, Darby & Cushman IP Group of Pillsbury Madison & Sutro LLP

[57] ABSTRACT

The invention provides a telephoto lens system that enables the camera operator to shoot an infinite to nearby object with stably maintained optical quality. This lens system comprises a first positive lens unit $G_1$, a second positive lens unit $G_2$, a third negative lens unit $G_3$ and a fourth positive lens unit $G_4$. The first unit comprises at least two positive lenses and a negative meniscus lens heavily concave on the image surface side; the second unit comprises a positive lens heavily convex on the object side and a doublet consisting of negative and positive lenses; the third unit comprises a doublet consisting of negative and positive lenses; and the fourth unit comprises a cemented doublet consisting of negative and positive lenses. While the first and second units remain fixed, the third and fourth units are moved for focusing. Specific conditions regarding the focal lengths of the units, the separation between adjacent units, and the amount of movement of the units are satisfied.

9 Claims, 13 Drawing Sheets

G1: 1st Lens Unit
G2: 2nd Lens Unit
G3: 3rd Lens Unit
G4: 4th Lens Unit

G1: 1st Lens Unit
G2: 2nd Lens Unit
G3: 3rd Lens Unit
G4: 4th Lens Unit

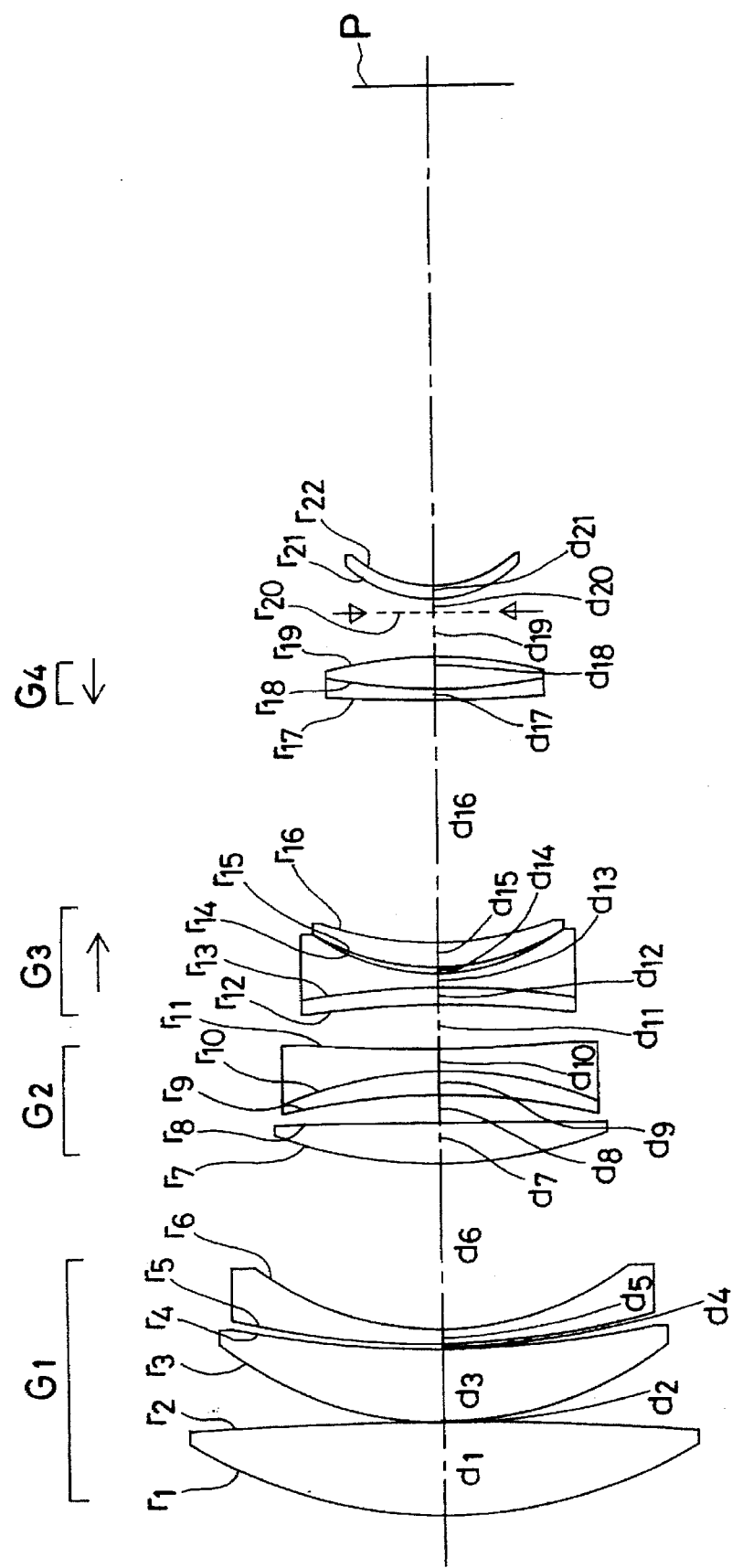

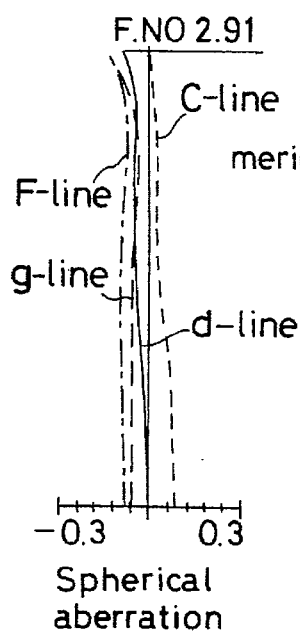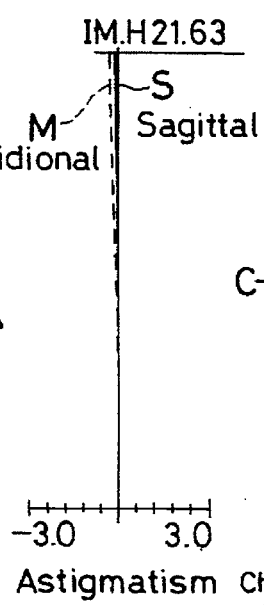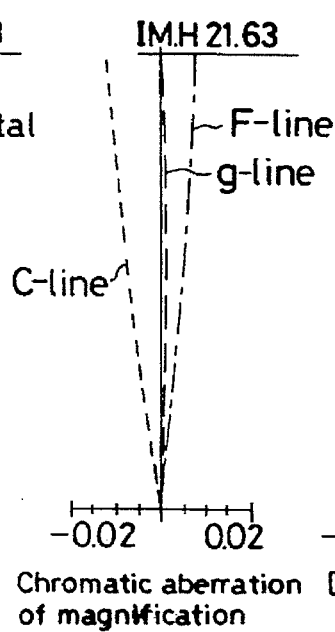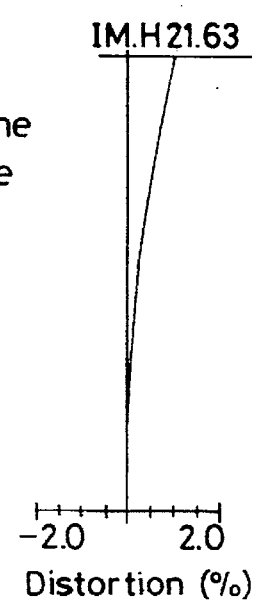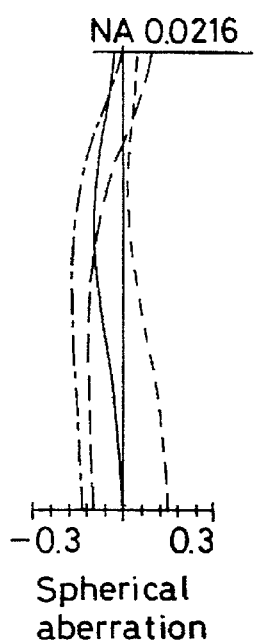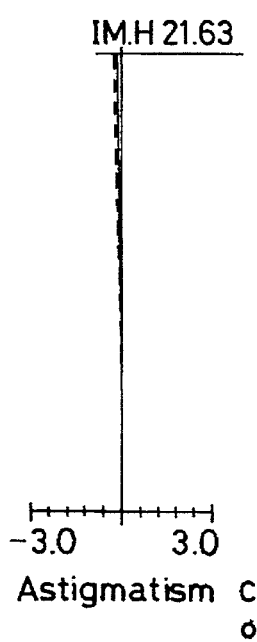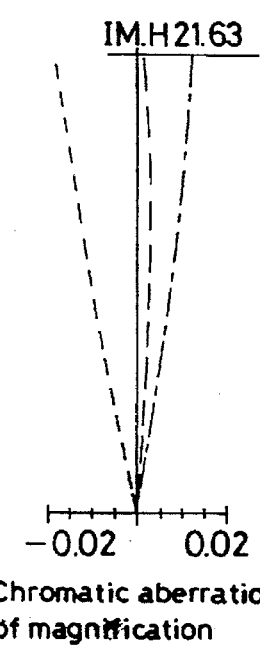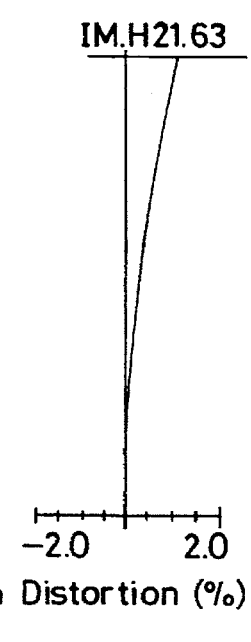

Spherical aberration

Astigmatism

Chromatic aberration of magnification

Distortion (%)

Spherical aberration

Astigmatism

Chromatic aberration of magnification

Distortion (%)

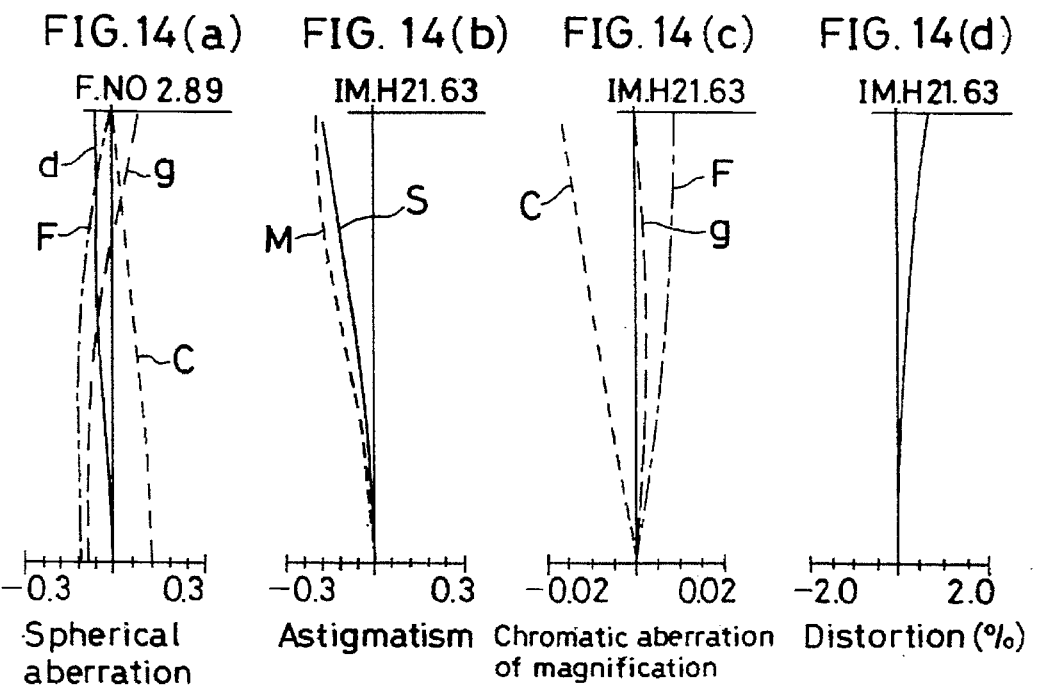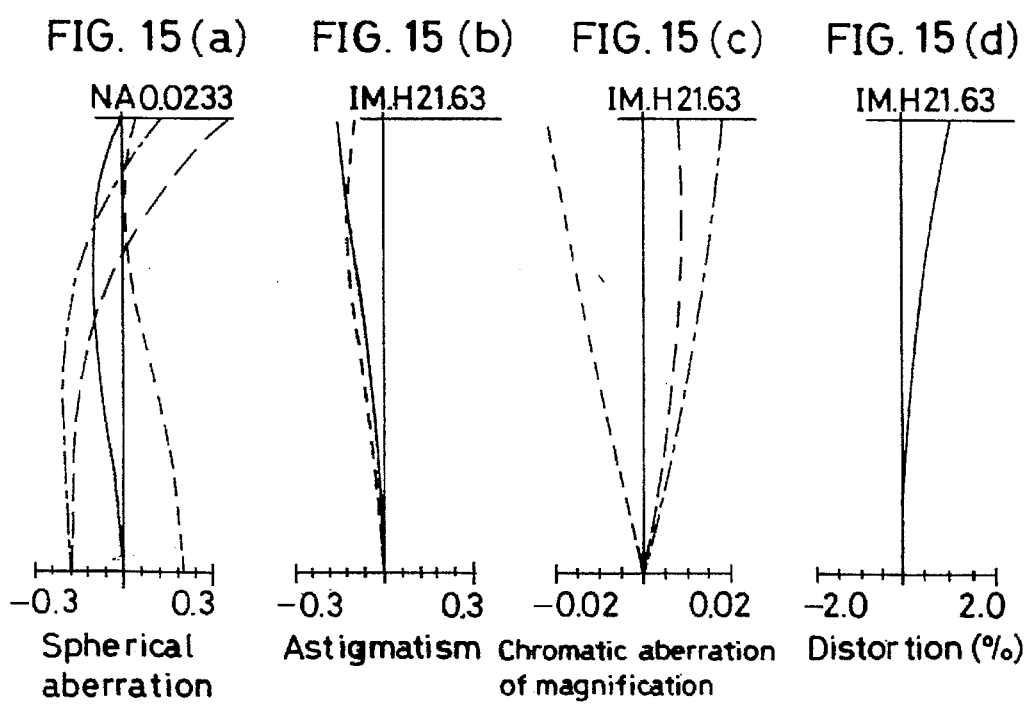

F.NO 2.83
Spherical aberration

IM.H 21.63
Astigmatism

IM.H 21.63
Chromatic aberration of magnification

IM.H 21.63
Distortion (%)

NA 0.0251
Spherical aberration

IM.H 21.63
Astigmatism

IM.H 21.63
Chromatic aberration of magnification

IM.H 21.63
Distortion (%)

F.NO 2.83
-0.2  0.2
Spherical aberration

IM.H 21.63
-0.2  0.2
Astigmatism

IM.H 21.63
-0.02  0.02
Chromatic aberration of magnification

IM.H 21.63
-2.0  2.0
Distortion (%)

NA 0.0251
-0.2  0.2
Spherical aberration

IM.H 21.63
-0.2  0.2
Astigmatism

IM.H 21.63
-0.02  0.02
Chromatic aberration of magnification

IM.H 21.63
-2.0  2.0
Distortion (%)

F.NO 2.89
-0.3   0.3
Spherical aberration

IM.H 21.63
-0.3   0.3
Astigmatism

IM.H 21.63
-0.02   0.02
Chromatic aberration of magnification

IM.H 21.63
-2.0   2.0
Distortion (%)

NA 0.0374
-0.3   0.3
Spherical aberration

IM.H 21.63
-0.3   0.3
Astigmatism

IM.H 21.63
-0.02   0.02
Chromatic aberration of magnification

IM.H 21.63
-2.0   2.0
Distortion (%)

TELEPHOTO LENS SYSTEM

BACKGROUND OF THE INVENTION

The present invention relates generally to a telephoto lens system, and more specifically to a telephoto lens system having an angle of field of about 8.24°, which is well suited for a large-aperture lens.

In many proposals made so far of telephoto lenses, the rear lens unit is often designed to be movable during focusing while weight balance during shooting, i.e., manipulability is taken into account. This design is particularly effective for super-telephoto lenses of increasing size. For instance, JP-A 50(1975)-139732 and 51(1976)-78326 achieve manipulability improvements by designing a negative lens group of the rear lens unit to be moved toward the image surface side. On the other hand, JP-A 52(1977)-117126 achieves similar effects by designing a positive lens group of the rear lens unit to be moved toward the object side.

It is JP-A 53(1978)-134425 and 59(1984)-36218 that disclose that such design is far more effective for a large-aperture telephoto lens system of increasing size.

As regards optical performance or quality, however, it is known that a focusing system making use of the movement of the rear lens unit is smaller in the amount of focusing movement at the same object distance than that making use of the movement of the overall system or front lens unit, but this system incurs some considerable aberration variations incidental to focusing.

A typical example of lens design for eliminating spherical aberration variations is disclosed in JP-A 55(1980)-147606 teaching that the spherical aberration variations are eliminated by a lens arrangement including a focusing lens unit together with a lens unit of very low refracting power. However, this lens design is less practical for shooting a nearby object.

Hereupon, it is known that a telephoto lens system comprising a front lens unit of positive refracting power and a rear lens unit of negative refracting power and having a reduced telephoto ratio can be achieved by placing the refracting power profile of the two lenses under properly selected conditions, and that the chromatic aberration peculiar to a telephoto lens system can be eliminated by use of anomalously partial-dispersing glass.

However, a grave technical problem remains unsolved about correction of noticeable aberration variations due to focusing by the rear lens unit when a shot is taken of a nearby object.

SUMMARY OF THE INVENTION

In view of the disadvantages and problems associated with conventional telephoto lens systems, it is an object of the present invention to provide a telephoto lens system which, with stably maintained optical quality, enables the camera operator to shoot an infinite to nearby object. That is, in view of the paraxial arrangement and the lens arrangement of movable lens units for focusing which form together the optical system, aberration variations incidental to the movement of the lens units are minimized.

According to the present invention, the above-mentioned object is achieved by the provision of a telephoto lens system which comprises, in order from the object side, at least a first lens unit of positive refracting power, a second lens unit of positive refracting power, a third lens unit of negative refracting power and a fourth lens unit of positive refracting power, said first lens unit comprising, in order from the object side, at least two positive lenses and a negative meniscus lens heavily concave on the image surface side, said second lens unit comprising at least a positive lens heavily convex on the object side and a doublet consisting of negative and positive lenses, said third lens unit comprising at least a doublet consisting of negative and positive lenses, and said fourth lens unit comprising at least a cemented doublet consisting of negative and positive lenses, with said third and fourth lens units being moved for focusing while said first and second lens units remain fixed, and which further conforms to the following four conditions (1) to (4):

$$0.3 < f_1/f_2 < 1.5 \quad (1)$$

$$0.1 < D_1/f_{12} < 0.55 \quad (2)$$

$$0.15 < -f_3/f_4 < 1.0 \quad (3)$$

$$0.3 < -\Delta X_3/\Delta X_4 < 3.1 \quad (4)$$

where:

$f_1$ is the focal length of the first lens unit, $f_2$ is the focal length of the second lens unit, $f_3$ is the focal length of the third lens unit, $f_4$ is the focal length of the fourth lens unit, $f_{12}$ is the composite focal length of the first and second lens units on the object point at infinity, $\Delta X_3$ is the amount of focusing movement of the third lens unit from the object point at infinity to the shortest object distance with the proviso that a plus sign indicates the movement of the third lens unit from the reference position on the object point at infinity to the image surface side, $\Delta X_4$ is the amount of focusing movement of the fourth lens unit from the object point at infinity to the shortest object distance with the proviso that a plus sign indicates the movement of the fourth lens unit from the reference position on the object point at infinity to the image surface side, and $D_1$ is the real separation between the first and second lens units.

Preferably, the following condition (5) is further satisfied.

$$|\beta_3| < |\beta_{3MOD}| \quad (5)$$

where:

$\beta_3$ is the paraxial lateral magnification of the third lens unit on the object point at infinity, and $\beta_{3MOD}$ is the paraxial lateral magnification of the third lens unit at the shortest object distance.

In addition to or apart from condition (5), it is desired that the following condition (6) be satisfied:

$$|\beta_4| > |\beta_{4MOD}| \quad (6)$$

where:

$\beta_4$ is the paraxial lateral magnification of the fourth lens unit on the object point at infinity, and $\beta_{4MOD}$ is the paraxial lateral magnification of the fourth lens unit at the shortest object distance.

A detailed account will now be given of why the above-mentioned lens arrangement is used and how it acts.

A basic embodiment of the lens arrangement of the present invention comprises a front lens unit $G_F$ having positive refracting power in its entirety and a rear lens unit $G_R$ having negative refracting power in its entirety, as schematically shown in FIG. 1. In view of the chromatic aberration produced by the front lens unit $G_F$ of positive refracting power, an anomalously dispersing vitreous material is used as correcting means, as is the case with the prior art.

To make the overall length of the optical system wihtout incurring malfunction on the basis of the refracting power distribution of the first and rear lens units $G_F$ and $G_R$, however, some care must be taken of the lens arrangement. Of importance for this is to locate the principal plane position in front of the optical system as well as to narrow the real separation between the front and rear lens units $G_F$ and $G_R$ without making the refracting power of each too high when the separation e' between the principal points of the front and rear lens units $G_F$ and $G_R$ is kept constant. Even in the case of a telephoto lens, it is desired to make the shortest object distance short. This, too, is effective for an aperture increase as well as shooting taking advantage of a shallow depth of field.

Thus, it is important to maintain stable image-formation performance or quality from an infinite to nearby object. The present invention has been made with such reasons in mind. A more basic embodiment of the telephoto lens system according to the present invention is illustrated in FIG. 2. The telephoto lens system of the present invention is characterized by comprising, in order from the object side, at least a first lens unit $G_1$ of positive refracting power, a second lens unit $G_2$ of positive refracting power, a third lens unit $G_3$ of negative refracting power and a fourth lens unit $G_4$ of positive refracting power, said first lens unit $G_1$ comprising, in order from the object side, at least two positive lenses and a negative meniscus lens heavily concave on the image surface side, said second lens unit $G_2$ comprising at least a positive lens heavily convex on the object side and a doublet consisting of negative and positive lenses, said third lens unit $G_3$ comprising at least a doublet consisting of negative and positive lenses, and said fourth lens unit $G_4$ comprising at least a cemented doublet consisting of negative and positive lenses, with said third and fourth lens units $G_3$ and $G_4$ being moved for focusing while said first and second lens units $G_1$ and $G_2$ remain fixed, and by conforming to the following four conditions (1) to (4):

$$0.3 < f_1/f_2 < 1.5 \tag{1}$$

$$0.1 < D_1/f_{12} < 0.55 \tag{2}$$

$$0.15 < -f_3/f_4 < 1.0 \tag{3}$$

$$0.3 < -\Delta X_3/\Delta X_4 < 3.1 \tag{4}$$

where:

$f_1$ is the focal length of the first lens unit, $f_2$ is the focal length of the second lens unit, $f_3$ is the focal length of the third lens unit, $f_4$ is the focal length of the fourth lens unit, $f_{12}$ is the composite focal length of the first and second lens units on the object point at infinity, $\Delta X_3$ is the amount of focusing movement of the third lens unit from the object point at infinity to the shortest object distance with the proviso that a plus sign indicates the movement of the third lens unit from the reference position on the object point at infinity to the image surface side, $\Delta X_4$ is the amount of focusing movement of the fourth lens unit from the object point at infinity to the shortest object distance with the proviso that a plus sign indicates the movement of the fourth lens unit from the reference position on the object point at infinity to the image surface side, and $D_1$ is the real separation between the first and second lens units.

Condition (1) is given to define the refracting powers of the first and second lens units $G_1$ and $G_2$. The second lens unit $G_2$ is located in the rear of the first lens unit $G_1$ at an axial separation of $D_1$. Condition (2) gives a definition of the refracting power profile of the first and second lens units $G_1$ and $G_2$. The first lens unit $G_1$ serves as a front unit and determines the focal length of the optical system by conforming to:

$$f = f_1 \cdot \beta_R$$

where f is the focal length of the overall system, $f_1$ is the focal length of the first lens unit $G_1$, and $\beta_R$ is the paraxial lateral magnification of the second to fourth lens units $G_2$, $G_3$ and $G_4$ on the object point at infinity.

More specifically, the first lens unit $G_1$ is a principal lens system while the depending or succeeding lens units form together a focal length-varying optical system of plus magnification. Consequently, various aberrations resulting from the first lens unit $G_1$ are sometimes magnified by $\beta_R$; in other words, the first lens unit $G_1$ must have refracting power and a lens arrangement sufficient to correct them by itself. The second lens unit $G_2$ is a fixed one like the first lens unit $G_1$. Part of the positive refracting power of the first lens unit $G_1$ is distributed to the second lens unit $G_2$ so that the refracting power of the first lens unit $G_1$ can be reduced and variations in the spherical and chromatic aberrations during focusing can be compensated for. Thus, the refracting powers of the first and second lens units must be in proper profile. It is otherwise difficult to correct the aberrations resulting from the front lens unit.

Referring further to condition (1), when the upper limit of 1.5 is exceeded, a portion of the spherical aberration that cannot be eliminated by the second lens unit $G_2$ is likely to remain in the form of residual aberration. This, at the same time, makes it difficult to correct the aberration by the succeeding lens units. When the lower limit of 0.3 is not reached, the second lens unit $G_2$ located as a positive lens one is less effective for correction of aberrations in view of the overall performance or quality of the optical system. In addition, the refracting power of the first lens unit $G_1$ must be increased so as to shorten the overall length of the lens system, resulting in an increase in the number of the lenses involved.

Condition (2) is used to determine the axial distance $D_1$ between the first and second lens units after the refracting power profile thereof is determined and thick lenses are allotted thereto according to condition (1). A super-telephoto lens has generally a large separation between the principal points. The refracting powers of the first and second lens units $G_1$ and $G_2$ are represented by condition (2). Hereupon it is the second lens unit $G_2$ that takes part in intensifying the convergency of the luminous flux by the refracting power of the first lens unit $G_1$; in other words, it is required to locate the lens units at proper positions according to condition (2). Here, since some limitation is imposed on the axial distance $D_1$ in view of the succeeding focusing lens units, this condition (2) is tantamount to determining the composite refracting power of the first and second lens units $G_1$ and $G_2$.

Referring further to condition (2) for determining $D_1$, exceeding the upper limit of 0.55 is preferable for a telephoto ratio reduction, but is not desired because residual aberrations such as spherical aberration and longitudinal chromatic aberration become large, resulting in an increase in the number of the lenses involved and, hence, a weight increase. That the lower limit of 0.1 is not reached is advantageous for correcting aberrations, but fails to give any desired result, because the converging luminous flux from the first lens unit $G_1$ becomes large; so the second lens unit $G_2$ becomes large, leading to a weight increase. $D_1$ larger than required is not preferred, because it gives rise to a change in the lens arrangement of the first lens unit $G_1$, which may otherwise diminish the action of the positive refracting power of the second lens unit $G_2$ to such an extent that there is a departure from the purport of the present invention.

Reference will then be made to how focusing is carried out according to the present invention.

In the present invention, focusing from the object point at infinity to a definite object point is achieved by moving the third lens unit $G_3$ toward the image side and, in association with this, moving the fourth lens unit $G_4$ toward the object side on condition that the reference position lies at infinity. Now consider the third lens unit $G_3$ as a first focusing lens one and the fourth lens unit $G_4$ as a second focusing lens one. Then the second lens unit $G_2$ is designed to produce aberrations for compensating for variations in the spherical aberration and longitudinal chromatic aberration during focusing. In other words, the second lens unit $G_2$ is taken not only as means for reducing the overall length of the lens system but also as a part of the focusing lens unit.

Condition (3) is given to determine the refracting powers of the third and fourth lens units $G_3$ and $G_4$. When the upper limit of 1.0 is exceeded, there is an increase in the amount of movement of the third lens unit $G_3$, which is not only disadvantageous for making the shortest object distance short, but also causes trouble to instantaneous shooting. When the lower limit of 0.15 is not reached, there is an increase in the amount of movement of the movable fourth lens unit $G_4$ toward the object side and, hence, in large aberration variations.

Condition (4) represents the quantitative ratio of focusing movement of the third and fourth lens units $G_3$ and $G_4$ to the shortest object distance on condition that the reference positions lie at the lens positions on the object point at infinity, and is very important for reducing aberration vibrations. The direction of this movement is shown by arrows in FIG. 2. Referring specifically to condition (4), when the upper limit of 3.1 is exceeded, the quantity of movement of the fourth lens unit $G_4$ is reduced relative to the quantity of movement of the third lens unit $G_3$, resulting in an increase in the amount of residual aberrations inclusive of a variation in the spherical aberration; that is, difficulty is involved in keeping stable image-formation performance at a short object distance, which is the purport of the present invention. When the lower limit of 0.3 is not reached, on the contrary, the quantity of movement of the fourth lens unit $G_4$ is increased, similarly resulting in an increase in the quantity of residual aberrations; that is, difficulty is again involved in keeping stable optical performance.

Referring here to the image-formation magnification of part of the focusing lens units, the following relation (5) holds for the third lens unit $G_3$ at an infinite to the shortest object distance:

$$|\beta_3|<|\beta_{3MOD}| \tag{5}$$

where:

$\beta_3$ is the paraxial lateral magnification of the third lens unit on the object point at infinity, and $\beta_{3MOD}$ is the paraxial lateral magnification of the third lens unit at the shortest object distance.

Also, the following relation (6) applies to the fourth lens unit $G_4$ at an infinite to the shortest object distance:

$$|\beta_4|>|\beta_{4MOD}| \tag{6}$$

where:

$\beta_4$ is the paraxial lateral magnification of the fourth lens unit on the object point at infinity, and $\beta_{4MOD}$ is the paraxial lateral magnification of the fourth lens unit at the shortest object distance.

These relations depend on what refracting power profile the optical system has and how focusing occurs. As can be seen from relations or conditions (5) and (6), the third and fourth lens units $G_3$ and $G_4$ increase and decrease in magnification, respectively, from an infinite to definite distance.

Based on the paraxial relations mentioned above, each lens unit is preferably constructed as follows.

The principal lens system or the first lens unit $G_1$ comprises at least two positive lenses and one negative lens, and includes therein at least two high-order aberration-producing surfaces, viz., an air lens.

Thick lenses are allotted to the first lens unit $G_1$ after the refracting power profile of the first and second lens units are determined according to conditions (1) and (2). These thick lenses are basically arranged in the order of positive, positive and negative, as viewed from the object side. One positive lens may be divided into two parts to construct a positive, positive, positive and negative arrangement having an increased refracting power, so that curvature of field and other quality parameters can be improved. It is the air lens that is made up of the high-order aberration-producing surfaces sandwiched between the positive and negative lenses and can reduce the amount of residual aberrations due to the first lens unit $G_1$. As will be understood from the examples to be given later, this air lens is largely characterized in that it is convex on the object side.

Needless to say, the first lens unit $G_1$ may comprise positive, negative and positive lenses, as viewed from the object side, although there is a telephoto ratio increase.

The second lens unit $G_2$ of positive refracting power comprises a front group $G_{21}$ of positive refracting power and a rear group $G_{22}$ of negative refracting power, as shown in FIG. 3. The front group $G_{21}$ comprises at least one positive lens having a heavy curvature on the object side, and a part of the refracting power of the first lens unit $G_1$ is distributed thereto. In view of function, the front group $G_{21}$ takes part in correction of the spherical aberration. This is very effective for a super-telephoto lens system having a narrow field of angle. The rear group $G_{22}$ consists of a doublet of positive and negative lenses. Preferably, the refracting power profile of the two lens groups $G_{21}$ and $G_{22}$ is given by $$0.2<-f_{21}/f_{22}<1.8 \tag{7}$$

where $f_{21}$ is the focal length of the front group $G_{21}$ of the second lens unit and $f_{22}$ is the focal length of the rear group $G_{22}$ of the second lens unit.

This relation (7) correlates with conditions (1) and (2). According to the present invention, if an air lens is sandwiched between the front and rear groups $G_{21}$ and $G_{22}$, then it is possible to correct high-order aberrations.

Now assume that the separation between the principal points of the front and rear groups $G_{21}$ and $G_{22}$ of the second lens unit $G_2$ has any specific value in the refracting power profile determined by condition (1). Then, when the upper limit of 1.8 in condition (7) is exceeded, the rear group $G_{22}$ has a stronger diverging action than the front group $G_{21}$. As a result, aberrations inclusive of spherical aberration are over-corrected. This is not preferable for correction of the aberrations of the entire system, ending up with degradation of short-distance quality. When the lower limit of 0.2 is not reached, on the other hand, the action of the positive front group $G_{21}$ becomes stronger than required. To correct this, a plurality of lens groups are needed. Besides, the effect of the rear group $G_{22}$ on correction of the chromatic aberration is likely to become slender.

To correct a longitudinal chromatic aberration variation during focusing, it is desired that the rear group $G_{22}$ be a cemented doublet consisting of negative and positive lenses with the combination of glasses conforming to the following relations (8) and (9):

$$0.1 < |N_n - N_p| < 0.35 \tag{8}$$

$$2 < |v_n - v_p| < 35 \tag{9}$$

where $N_n$ is the refractive index of the negative lens in the rear group $G_{22}$, $N_p$ is the refractive index of the positive lens in the rear group $G_{22}$, $v_n$ is the Abbe's number of the negative lens in the rear group $G_{22}$, and $v_p$ is the Abbe's number of the positive lens in the rear group $G_{22}$, all for dominant wavelength.

The object of conditions (8) and (9) is not only to correct the chromatic aberration of the cemented doublet by providing a designation of what kind of glass is used, but also to reduce a variation in the chromatic aberration during focusing. It is desired to make determination of what kind of glass is used for the negative and positive lenses of the rear group $G_{22}$ so as to satisfy conditions (8) and (9).

Referring specifically to condition (8), when the upper limit of 0.35 is exceeded, the residual aberrations of the second lens unit $G_2$ often become large, although there is left a certain degree of freedom in the correcting actions of the lens units other than the second lens unit $G_2$. Consequently, some aberration variation remains at a short distance; it is difficult to achieve well-corrected circumstances, although the aberrations are well corrected on the object point at infinity. With the lower limit of 0.1 not reached, on the other hand, when the focusing lens units are corrected by themselves in terms of chromatic aberration, it is likely that the amount of the residual high-order aberrations of the second lens unit $G_2$ for each wavelength can increase, and so cannot be corrected by other lens units.

Referring then to condition (9), when the upper limit of 35 is exceeded, aberrations are well corrected at a designated object point, but the change in the aberrations produced becomes sensitive to wavelength, if there is a change in the passage of the bundle of rays. That the lower limit of 2 is not reached is unpractical, because it is of no substantial significance for actual correction of the chromatic aberration.

How aberrations are corrected in an optical system satisfying the above-mentioned conditions will now be explained with reference to Example 1 to be given later. Shown in Table 1 are the third-order aberration coefficients of each lens unit in Example 1 with SA, CM, AS and DS representing the spherical aberration, coma, astigmatism and distortion coefficients and PT standing for the Petzval's sum.

TABLE 1

| | SA | CM | AS | DS | PT |
|---|---|---|---|---|---|
| 1st Lens Unit | −0.3551 | 0.7739 | −0.2197 | 0.2320 | −0.0269 |
| 2nd Lens Unit | 0.6487 | −1.1352 | 0.1606 | −0.0198 | −0.0014 |
| 3rd Lens Unit | −0.0169 | −0.1286 | 0.1238 | −0.1477 | 0.0642 |
| 4th Lens Unit | −0.2926 | 0.5206 | −0.0687 | 0.0060 | −0.0423 |
| Entire System | −0.0159 | 0.0307 | −0.004 | 0.0705 | −0.0064 |

Referring to the object point at infinity, the spherical aberration is under-corrected by the first lens unit $G_1$ but over-corrected by the second lens unit $G_2$, and is then properly redone mainly by the fourth lens unit $G_4$ that produces an extra aberration. Each lens unit has a similar action on the fifth- and seventh-order spherical aberrations. The astigmatism is similarly corrected with the exception that the third lens unit $G_3$ has an over-correcting action thereon. The coma, on the other hand, is over-corrected by the first lens unit $G_1$ but under-corrected by the second lens unit $G_2$, and is then redone by the fourth lens unit $G_4$ having an over-correcting action. The distortion is overall reduced by allowing the first lens unit $G_1$ to make its value positive and the second and third lens units $G_2$ and $G_3$ to make its value negative.

From this example, it is evident that the lens arrangement of the second lens unit $G_2$ has a strong action on correction of the aberrations. It is also understood that the high-order aberrations occur due to the action of the air lens formed by the first positive lens and the negative-positive doublet of negative refracting power in the second lens unit $G_2$. Shown in Table 2 are the third-order aberration coefficients and the fifth-order spherical aberration coefficient SA5 of the surfaces of the second lens unit $G_2$. The high-order aberrations produced have an action on correction of the residual aberrations in the first lens unit $G_1$.

TABLE 2

| Surface No. | SA | SA5 | CM | AS | DS | PT |
|---|---|---|---|---|---|---|
| 9 | 0.0022 | −0.0011 | −0.0019 | 0.0000 | 0.0018 | −0.0651 |
| 10 | −2.3564 | −0.4900 | 5.3845 | −1.3671 | 1.0436 | −0.0031 |
| 11 | 3.8240 | 0.7906 | −8.1078 | 1.9100 | −1.3703 | 0.0289 |
| 12 | −0.8404 | −0.1936 | 1.5681 | −0.3251 | 0.2065 | −0.0070 |
| 13 | −0.0009 | 0.0008 | 0.0218 | −0.0573 | 0.0986 | 0.0448 |

Set out in Table 3 are the aberration coefficients of the entire system of Example 1 on the object point at infinity and an object distance of 2.5 m with SA, CM, AS, DS, PT, L and T representing the third-order spherical aberration coefficient, the third-order coma coefficient, the third-order astigmatism coefficient, the third-order distortion coefficient, the Petzval's sum, the first-order longitudinal chromatic aberration coefficient and the first-order chromatic aberration of magnification coefficient, respectively. From Example 1, it is found that the variations of aberrations are very limited.

TABLE 3

|  | SA | CM | AS | DS | PT |
|---|---|---|---|---|---|
| Infinity | −0.0159 | 0.0305 | −0.0040 | 0.0704 | −0.0063 |
| 2.5 m | −0.0226 | 0.0346 | −0.0031 | 0.0725 | −0.0050 |

|  | L | T |
|---|---|---|
| Infinity | −0.00461 | 0.00385 |
| 2.5 m | −0.0064 | 0.00527 |

Of importance for correction of aberration vibrations due to focusing is not only the lens arrangement of each lens unit but also the condition for the amount of movement of the lens units according to condition (4). The aberration coefficients of Example 1 are shown in Table 4 for infinity and Table 5 for an object distance of 2.5 m, with SA, CM, AS, L and T representing the third-order spherical aberration coefficient, the third-order coma coefficient, the third-order astigmatism coefficient, the first-order longitudinal chromatic aberration coefficient and the first-order chromatic aberration of magnification coefficient, respectively.

TABLE 4

|  | SA | CM | AS | L | T |
|---|---|---|---|---|---|
| 1st Lens Unit | −0.3551 | 0.7739 | −0.2197 | 0.08995 | −0.05123 |
| 2nd Lens Unit | 0.6487 | −1.1352 | 0.1606 | −0.10138 | 0.05462 |
| 3rd Lens Unit | −0.0169 | −0.1286 | 0.1238 | 0.00343 | 0.00206 |
| 4th Lens Unit | −0.2926 | 0.5206 | −0.0687 | 0.00338 | −0.00160 |
| Entire System (∞) | −0.0159 | 0.0307 | −0.004 | −0.0046 | 0.00385 |

TABLE 5

|  | SA | CM | AS | L | T |
|---|---|---|---|---|---|
| 1st Lens Unit | −0.2796 | 0.5372 | −0.1363 | 0.08378 | −0.04609 |
| 2nd Lens Unit | 0.4983 | −0.9488 | 0.1515 | −0.09600 | 0.05073 |
| 3rd Lens Unit | −0.0089 | −0.0661 | 0.0804 | 0.00274 | 0.00238 |
| 4th Lens Unit | −0.2325 | 0.5123 | −0.0986 | 0.00306 | −0.00175 |
| Entire System (2.5 m) | −0.0227 | 0.0346 | −0.003 | −0.0064 | 0.00527 |

Referring to Seidel's five aberrations, their overall variations are reduced by the combined action of an aberration variation in the movable lens units during focusing and an aberration variation in the fixed lens units or the first and second lens units $G_1$ and $G_2$.

As can be seen from Tables 4 and 5, the chromatic aberration variation is reduced by reducing the chromatic aberration in the movable lens units during focusing and allowing the fixed lens units or the first and second lens units $G_1$ and $G_2$ to produce large aberrations of opposite signs. This is one great feature of the present invention.

Still other objects and advantages of the present invention will in part be obvious and will in part be apparent from the specification.

The present invention accordingly comprises the features of construction, combinations of elements, and arrangement of parts which will be exemplified in the construction hereinafter set forth, and the scope of the present invention will be indicated in the claims.

BRIEF DESCRIPTION OF THE DRAWINGS

FIG. 9 is a sectional view of the lens arrangement of Example 6 when focused on the object point at infinity.

FIG. 10 is an aberration diagram of Example 1 when focused on the object point at infinity, with (a), (b), (c) and (d) representing the spherical aberration, astigmatism, chromatic aberration of magnification and distortion, respectively.

FIG. 11 is an aberration diagram, similar to FIG. 10, of Example 1 when focused on the shortest object point.

FIG. 14 is an aberration diagram, similar to FIG. 10, of Example 3 when focused on the object point at infinity.

FIG. 15 is an aberration diagram, similar to FIG. 10, of Example 3 when focused on the shortest object point.

DESCRIPTION OF THE PREFERRED EMBODIMENTS

In the following description, Examples 1 to 6 of the telephoto lens system according to the present invention will be explained.

Figure 1:
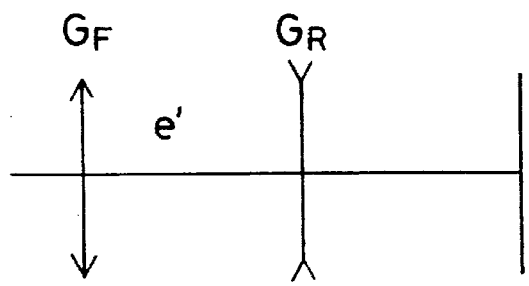
FIG. 1 is a schematic of the basic refracting power profile of the telephoto lens system according to the present invention.
Figure 2:
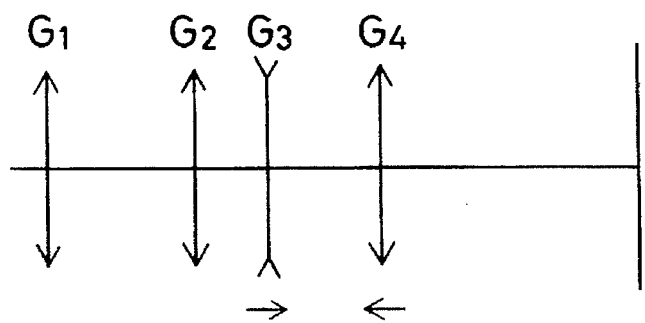
FIG. 2 is a schematic of the unit arrangement and focusing units of the telephoto lens system according to the present invention.
Figure 3:
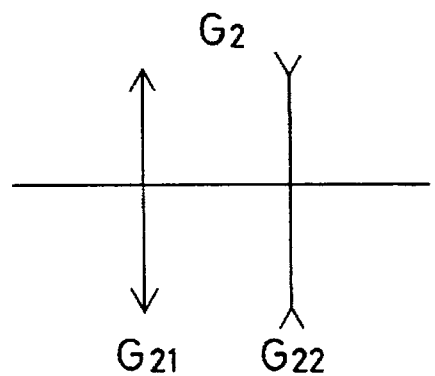
FIG. 3 is a schematic of the lens arrangement of the second lens unit.
Figure 4:
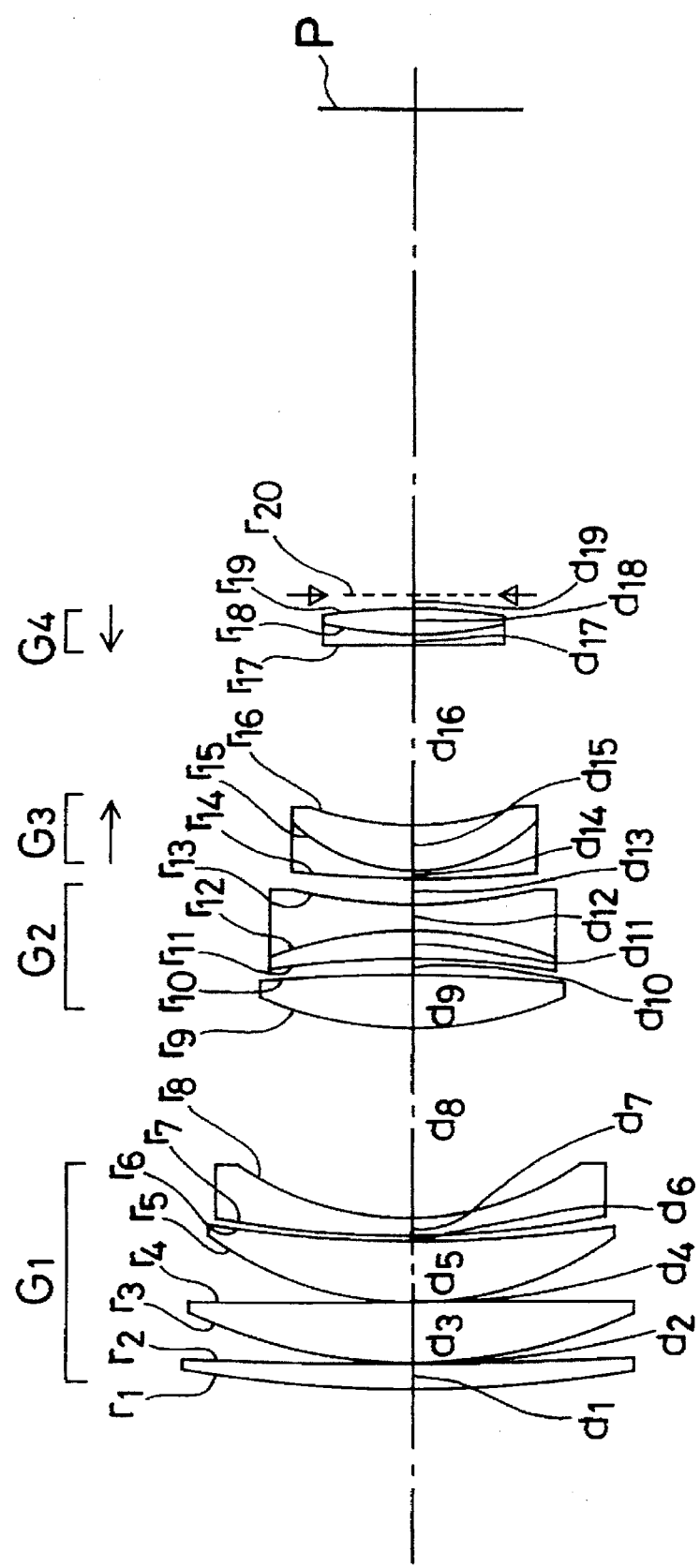
FIG. 4 is a sectional view of the lens arrangement of Example 1 when focused on the object point at infinity.

Numerical data on each example will be enumerated later. Example 1 is directed to a telephoto lens system having a focal length of 295.4 mm and an aperture ratio of 1:2.91 with the proviso that film diagonal length is 3.27 mm (this shall apply hereinafter). This lens system includes a first lens unit $G_1$ which consists of three positive lenses, i.e., a positive meniscus lens convex on the object side, a double-convex lens and a positive meniscus lens convex on the object side, and a negative meniscus lens convex on the object side, as can be seen from the sectional schematic of FIG. 4 showing this lens system focused on the object point at infinity. An air lens is interposed between the third and fourth lenses. It is here to be noted that anomalously partial-dispersing glasses are used for the second and third positive lenses. The second lens unit $G_2$ is made up of a double-convex lens heavily convex on the object side and a doublet with an air lens located therebetween, said doublet consisting of a positive meniscus lens convex on the image surface side and a double-concave lens. High-order aberrations are corrected by the air lens surfaces interposed between both the lenses. The third lens unit $G_3$ consists of a doublet of a negative meniscus lens convex on the object side and a positive meniscus lens, and the fourth lens unit $G_4$ consists of a doublet of a negative meniscus lens convex on the object side and a double-convex lens. Letter "P" stands for the image surface.

Focusing from the infinite state of FIG. 4 to about 2.5 mm or a telephoto ratio of −0.0142 is achieved by moving the third lens unit $G_3$ toward the image surface side by a distance of 20.26 mm and, at the same time, moving the fourth lens unit $G_4$ toward the object side by a distance of 14.24 mm. One feature of this example is that the amount of high-order aberrations produced in the air lenses in the first and second lens units $G_1$ and $G_2$ is large.

Aberration diagrams of this example when focused on the object point at infinity and on a definite object point and at a telephoto ratio of −0.0142 are attached hereto as FIGS. 10 and 11, respectively, with (a), (b), (c) and (d) representing the spherical aberration, astigmatism, chromatic aberration of magnification and distortion, respectively. From these diagrams, it is found that while the chromatic aberration of magnification varies somewhat noticeably, the entire aberration variation is reduced and corrected to a very satisfactory level.

Figure 5:
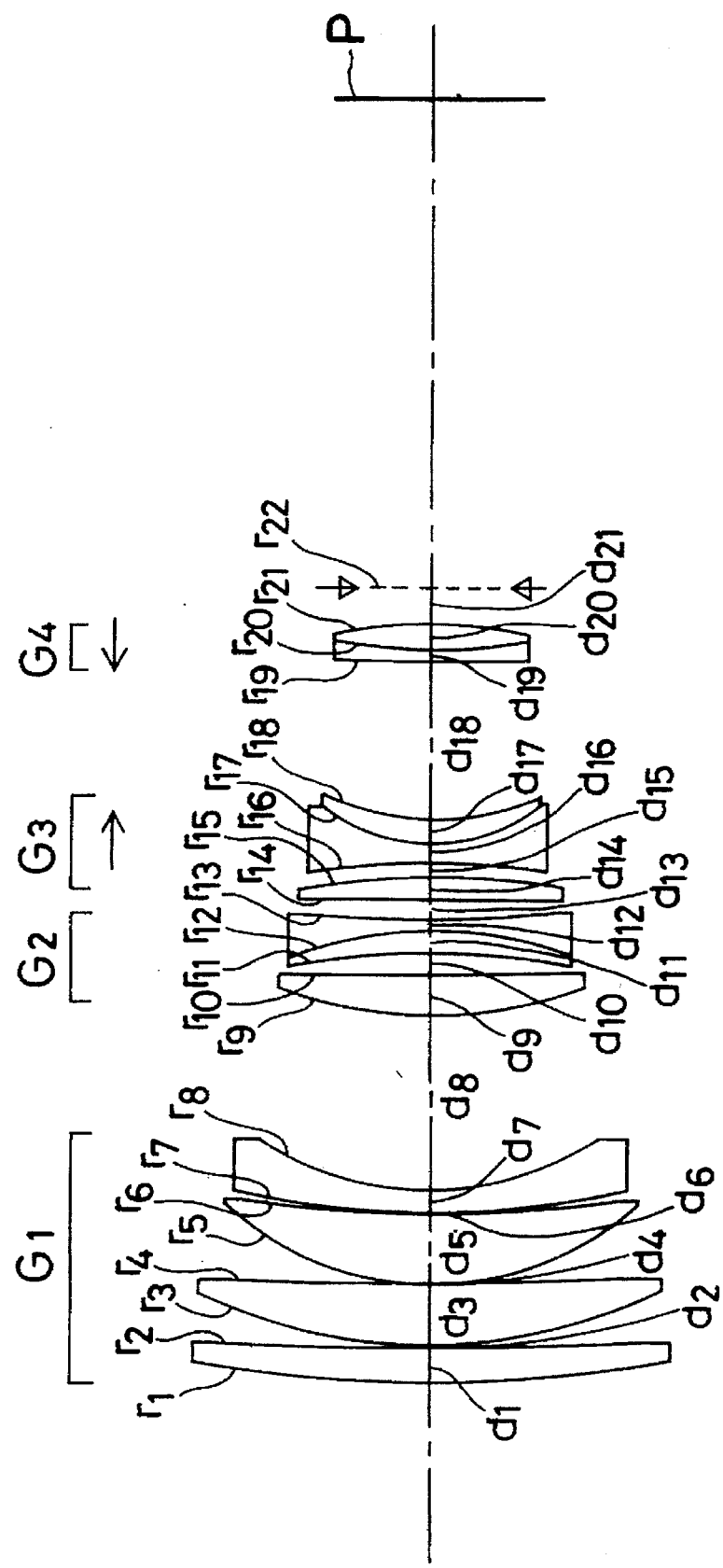
FIG. 5 is a sectional view of the lens arrangement of Example 2 when focused on the object point at infinity.

Example 2 is directed to a telephoto lens system having a focal length of 292.6 mm and an aperture ratio of 1:2.85. With this lens system, a maximum telephoto ratio of −0.18 is achievable at the shortest object distance of about 2 m. This lens system includes a first focusing unit or a third lens unit $G_3$ which has an increased refracting power and consists of three lenses, i.e., a positive lens and a doublet, as can be seen from the sectional schematic of FIG. 5 showing this lens system focused on the object point at infinity, so that the amount of focusing movement can be reduced. The amount of focusing movement of the fourth lens unit $G_4$ is again reduced.

The first lens unit $G_1$ consists of three positive meniscus lenses, each convex on the object side, and a negative meniscus lens convex on the object side. An air lens is located between the third and fourth lenses. It is here to be noted that anomalously partial-dispersing glasses are used for the third and fourth lenses. The second lens unit $G_2$ is made up of a positive meniscus lens heavily convex on the object side and a doublet with an air lens interposed between them, said doublet consisting of a positive meniscus lens convex on the image surface side and a double-concave lens. The third lens unit $G_3$ consists of a positive meniscus lens convex on the image surface side and a doublet of a double-concave lens and a positive meniscus lens convex on the object side. The fourth lens unit $G_4$ consists of a cemented doublet of a negative meniscus lens convex on the object side and a double-convex lens. Focusing is done as in Example 1.

Aberration diagrams of this example when focused on the object point at infinity and on a definite object point and at a telephoto ratio of −0.18 are attached hereto as FIGS. 12 and 13, respectively.

Figure 6:
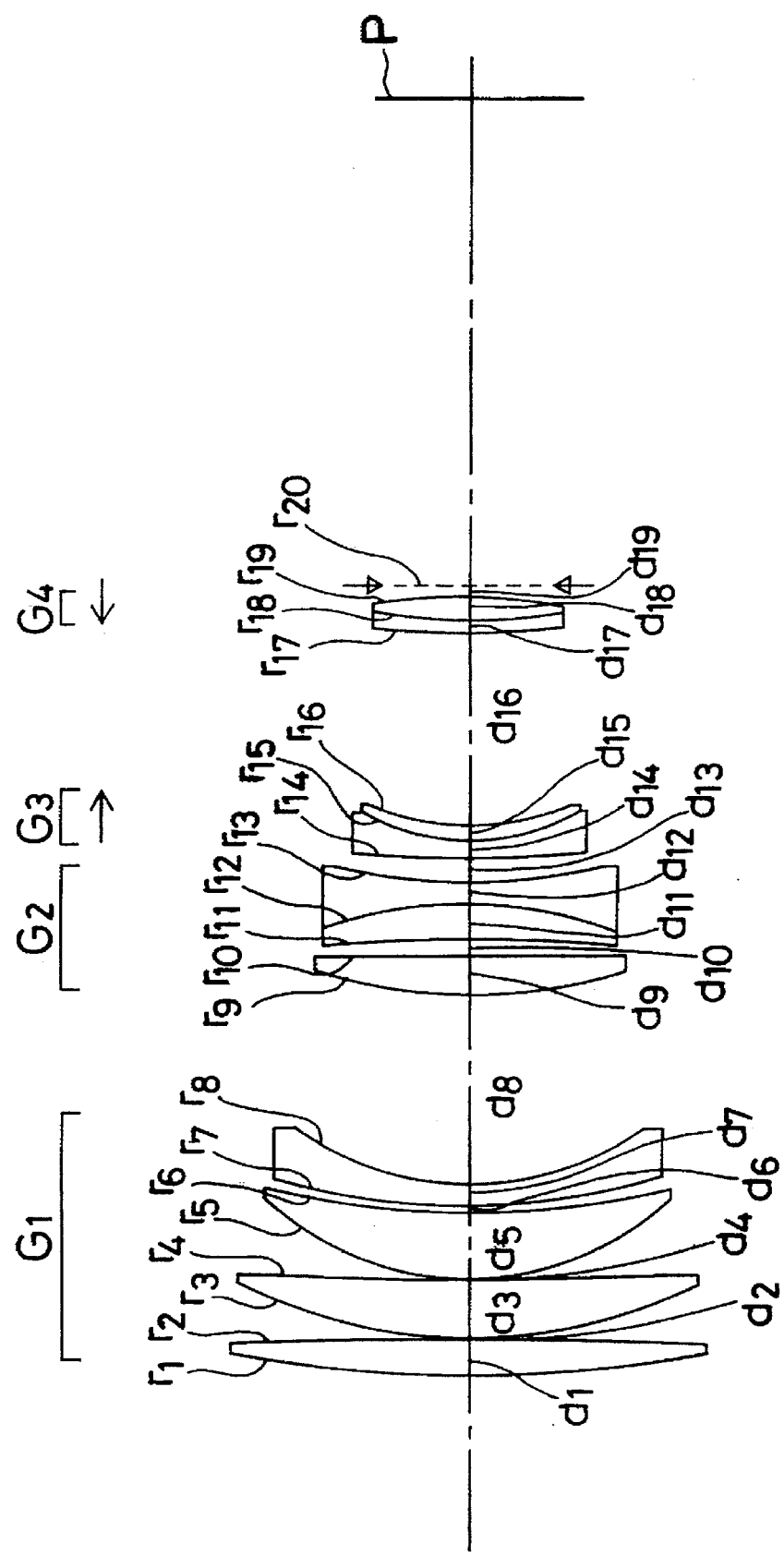
FIG. 6 is a sectional view of the lens arrangement of Example 3 when focused on the object point at infinity.

Example 3 is directed to a telephoto lens system having a focal length of 295.5 mm and an aperture ratio of 1:2.89. This lens system is similar to that of Example 1. As shown in the sectional schematic of FIG. 6 showing this lens system focused on the object point at infinity, the amount of high-order aberrations occurring in the air lenses in the first and second lens units $G_1$ and $G_2$ is somewhat reduced and, instead, the lens units are arranged in such refracting power profile that each lens unit has a reduced refracting power.

The first lens unit $G_1$ consists of three positive lenses, i.e., a double-convex lens and two positive meniscus lenses, each convex on the object side, and a negative meniscus lens convex on the object side. An air lens is interposed between the third and fourth lenses. It is here to be noted that anomalously partial-dispersing glasses are used for the second and third positive lenses. The second lens unit $G_2$ is made up of a positive meniscus lens heavily convex on the object side and a doublet with an air lens located between them, said doublet consisting of a positive meniscus lens convex on the image surface side and a double-concave lens. The third lens unit $G_3$ consists of a doublet of a negative meniscus lens convex on the object side and a positive meniscus lens, and the fourth lens unit $G_4$ consists of a cemented doublet of a negative meniscus lens convex on the object side and a double-convex lens. Focusing occurs as in Example 1.

Aberration diagrams of this example when focused on the object point at infinity and on a definite object point and at a telephoto ratio of −0.142 are attached hereto as FIGS. 14 and 15, respectively.

Figure 7:
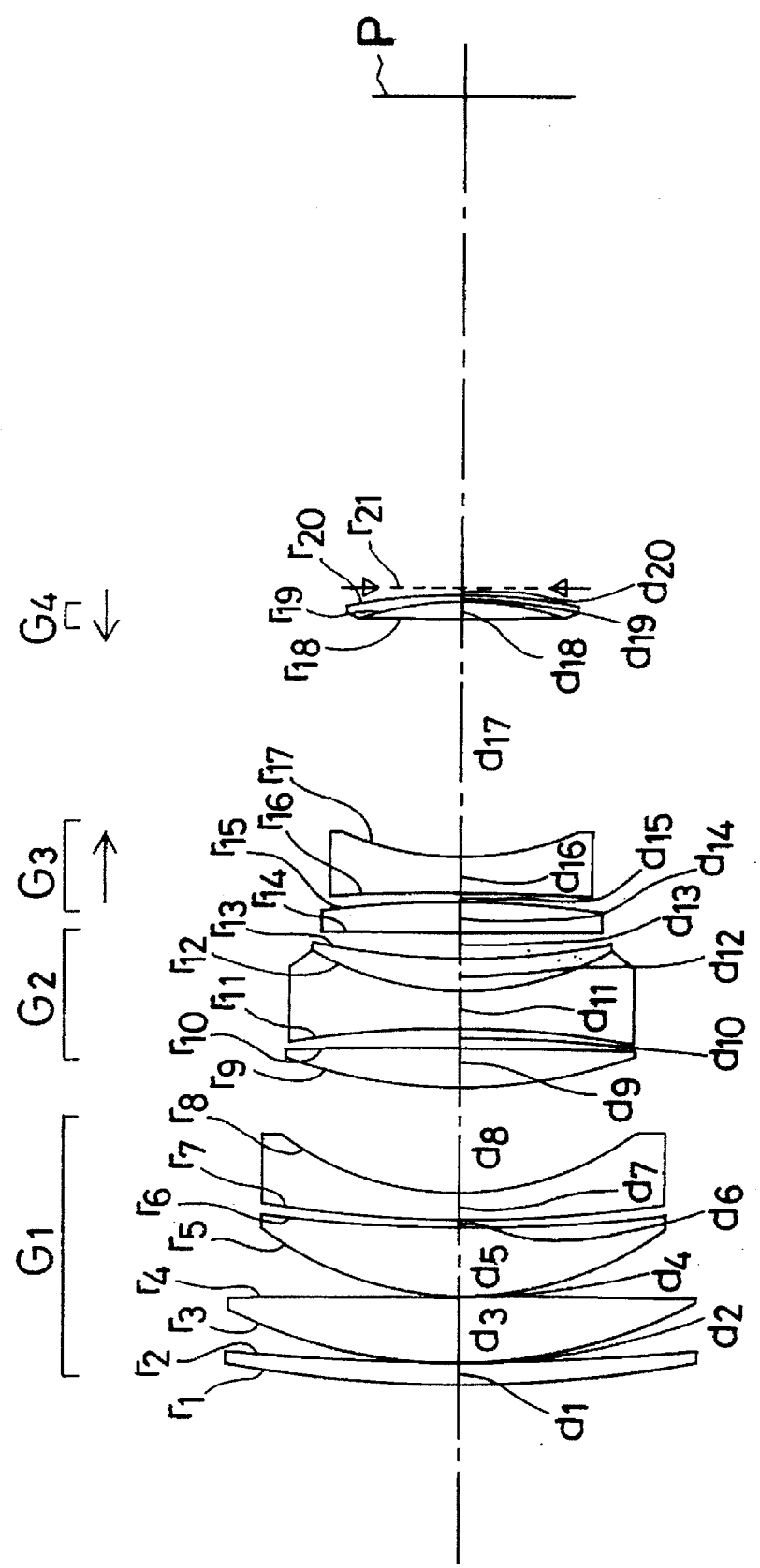
FIG. 7 is a sectional view of the lens arrangement of Example 4 when focused on the object point at infinity.

Example 4 is directed to a telephoto lens system having a focal length of 291.2 mm and an aperture ratio of 1:2.83. This lens system is greatly characterized in that the distance between the first and second lens units $G_1$ and $G_2$ is short. In this example, the amount of movement of the third lens unit $G_3$ is much larger than the amount of movement of the fourth lens unit $G_4$. As can be seen from the sectional schematic of FIG. 7 showing this lens system focused on the object point at infinity, the third lens unit $G_3$ consists of, rather than a cemented lens, a doublet of positive and negative lenses with an air lens located between them.

The first lens unit $G_1$ consists of three positive lenses, each convex on the object side, and a negative meniscus lens. An air lens is interposed between the third and fourth lenses. It is here to be noted that anomalously partial-dispersing glasses are used for the second and third positive lenses. The second lens unit $G_2$ is made up of a double-convex lens heavily convex on the object side and a doublet with an air lens located between them, said doublet consisting of a double-concave lens and a positive meniscus lens convex on the object side. The third lens unit $G_3$ consists of a double-convex lens and a double-concave lens, and the fourth lens unit $G_4$ consists of a cemented doublet of a double-convex lens and a negative meniscus lens convex on the image surface side. Focusing occurs as in Example 1.

Figure 16A:
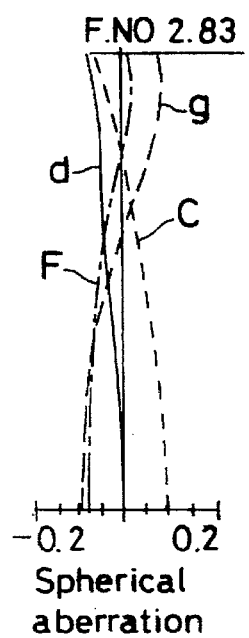
FIG. 16 is an aberration diagram, similar to FIG. 10, of Example 4 when focused on the object point at infinity.
Figure 16:
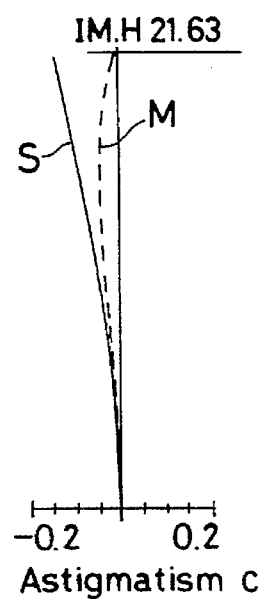
Figure 16:
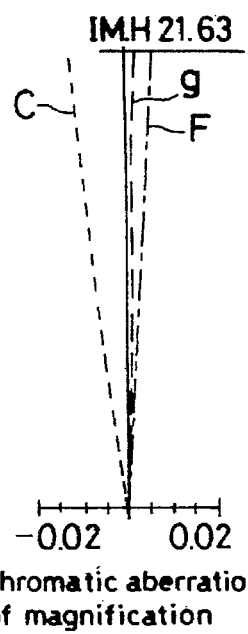
Figure 16:
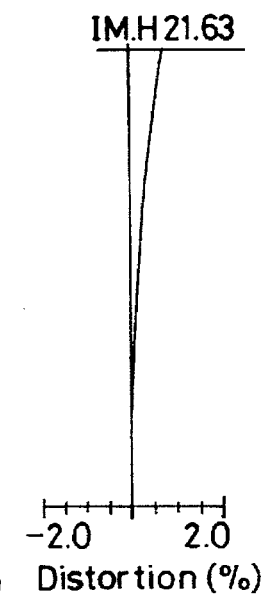
Figure 17:
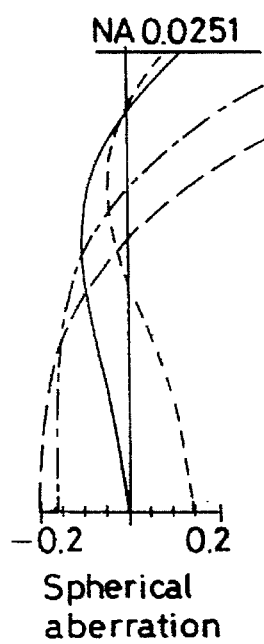
FIG. 17 is an aberration diagram, similar to FIG. 10, of Example 4 when focused on the shortest object point.
Figure 17:
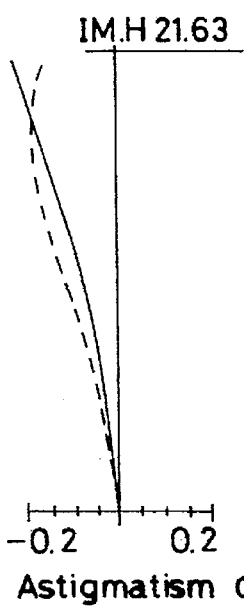
Figure 17:
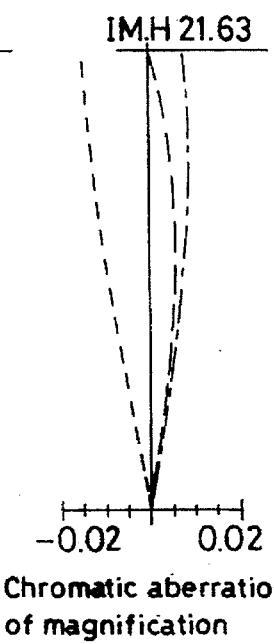
Figure 17:
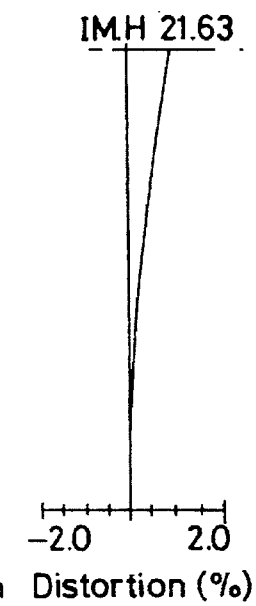
Figure 18A:
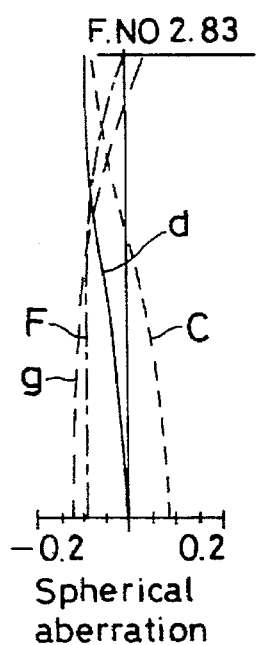
FIG. 18 is an aberration diagram, similar to FIG. 10, of Example 5 when focused on the object point at infinity.
Figure 18B:
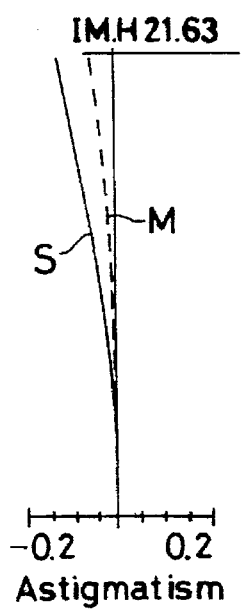
Figure 18C:
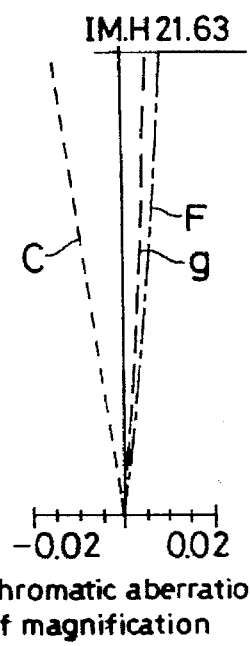
Figure 18D:
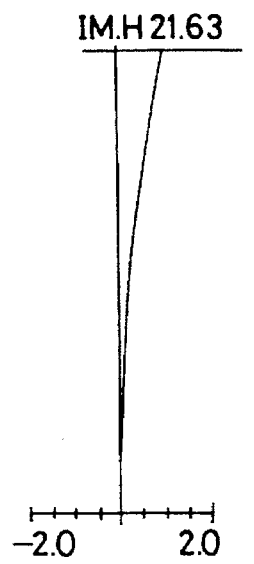
Figure 19A:
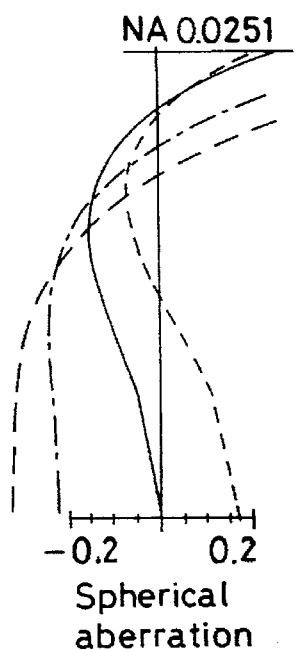
FIG. 19 is an aberration diagram, similar to FIG. 10, of Example 5 when focused on the shortest object point.
Figure 19B:
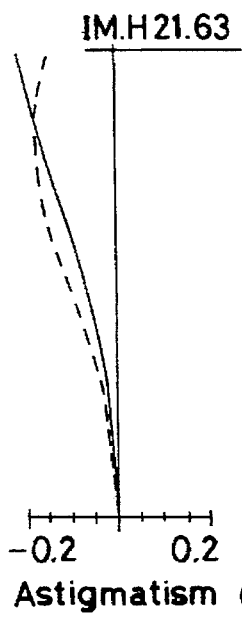
Figure 19C:
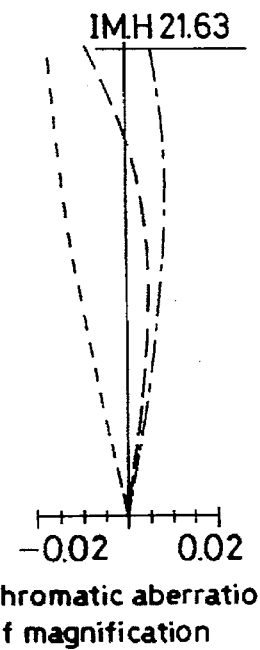
Figure 19D:
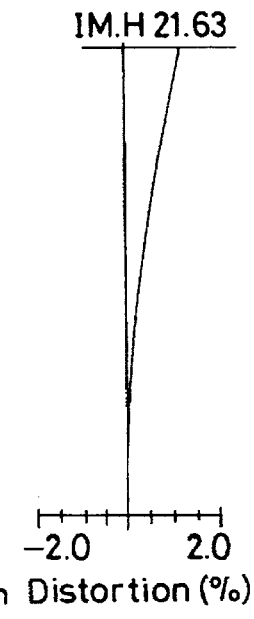
Figure 20A:
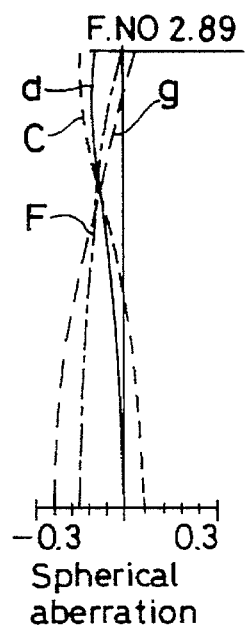
FIG. 20 is an aberration diagram, similar to FIG. 10, of Example 6 when focused on the object point at infinity.
Figure 20B:
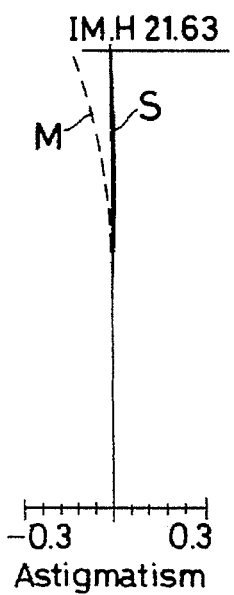
Figure 20C:
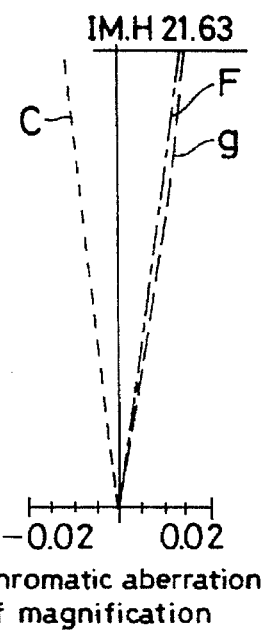
Figure 20D:
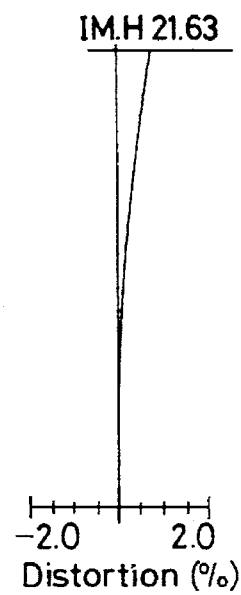
Figure 21A:
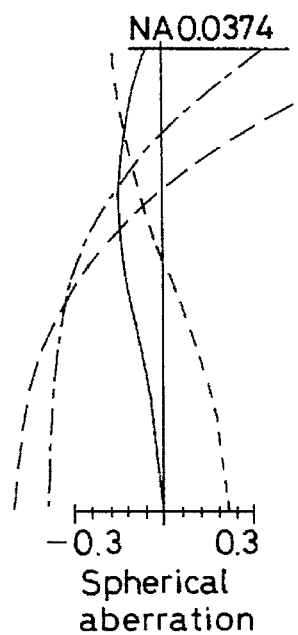
FIG. 21 is an aberration diagram, similar to FIG. 10, of Example 6 when focused on the shortest object point.
Figure 21B:
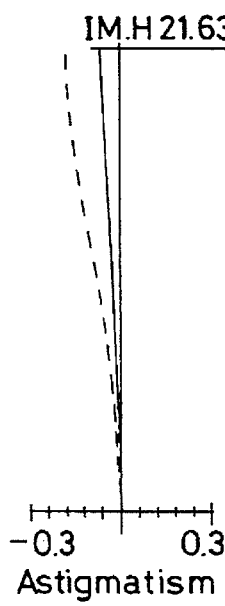
Figure 21C:
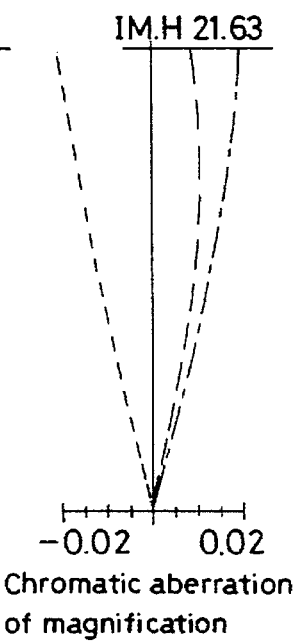
Figure 21D:
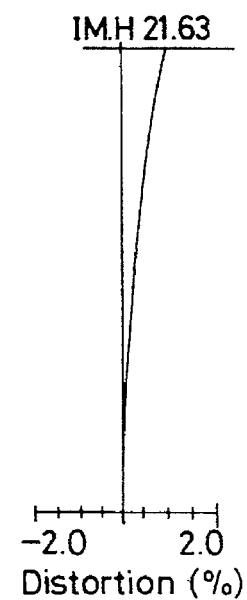

Aberration diagrams of this example when focused on the object point at infinity and on a definite object point and at a telephoto ratio of −0.142 are attached hereto as FIGS. 16 and 17.

Example 5 is directed to a telephoto lens system having a focal length of 291.2 mm and an aperture ratio of 1:2.83. In this example, the refracting powers of the first and second lens units $G_1$ and $G_2$ are somewhat increased. Also, the absolute values of the amount of movement of the third and fourth lens units $G_3$ and $G_4$ to the shortest object distance are close to each other.

Figure 8:
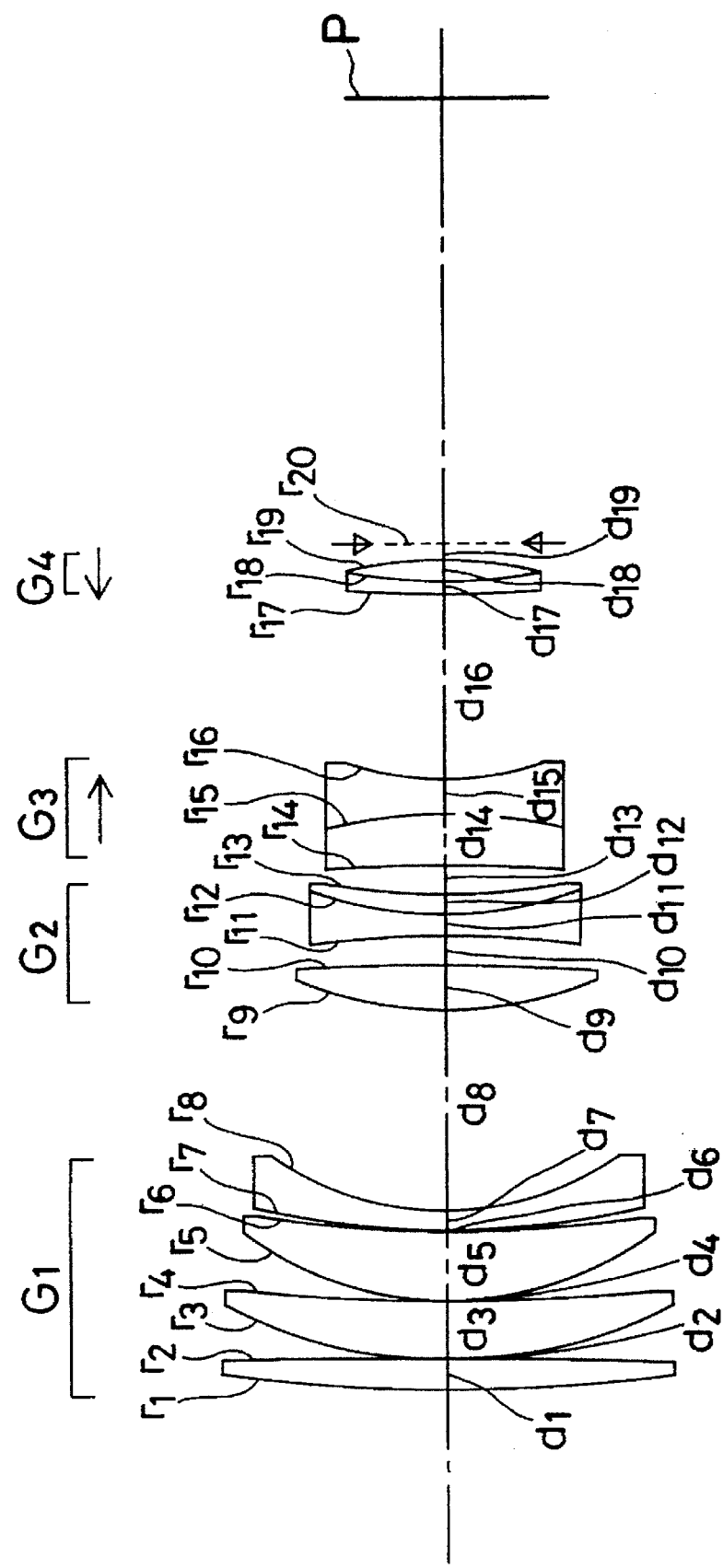
FIG. 8 is a sectional view of the lens arrangement of Example 5 when focused on the object point at infinity.
Figure 12A:
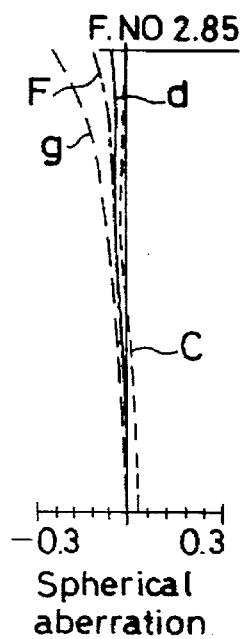
FIG. 12 is an aberration diagram, similar to FIG. 10, of Example 2 when focused on the object point at infinity.
Figure 12B:
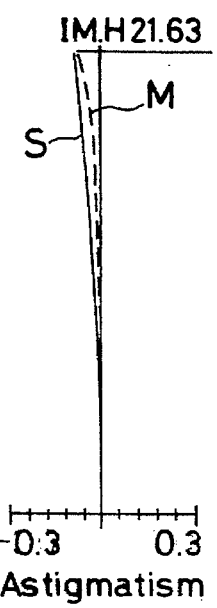
Figure 12C:
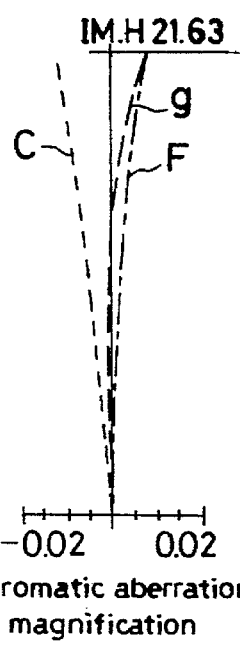
Figure 12D:
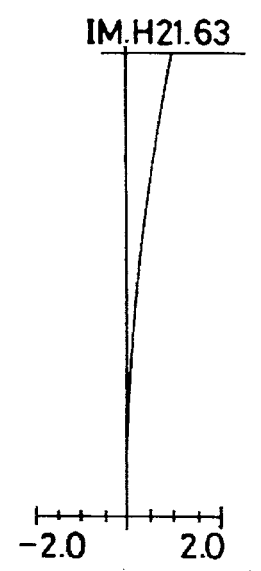
Figure 13A:
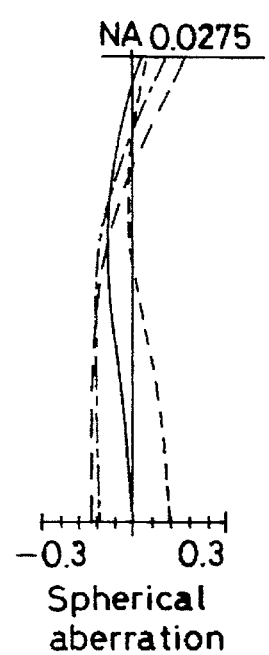
FIG. 13 is an aberration diagram, similar to FIG. 10, of Example 2 when focused on the shortest object point.
Figure 13B:
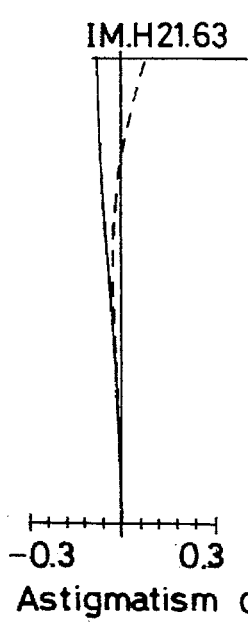
Figure 13C:
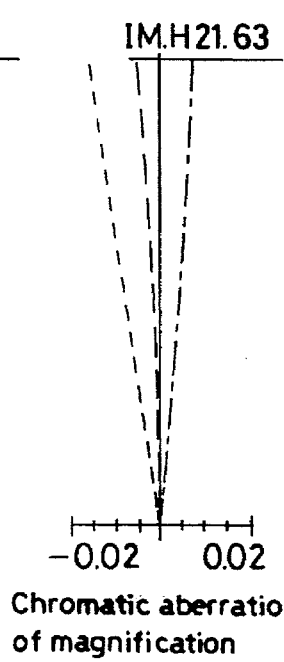
Figure 13D:
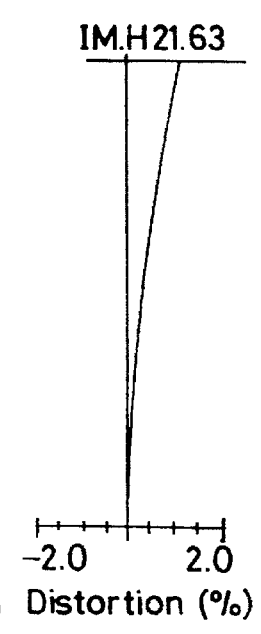

As can be seen from the sectional schematic of FIG. 8 showing this lens system focused on the object point at infinity, the first lens unit $G_1$ consists of three positive meniscus lenses, each convex on the object side, and a negative meniscus lens convex on the object side. An air lens is interposed between the third and fourth lenses. It is here to be noted that anomalously partial-dispersing glasses are used for the second and third positive lenses. The second lens unit $G_2$ is made up of a positive meniscus lens heavily convex on the object side and a doublet with an air lens interposed between them, said doublet consisting of a double-concave lens and a positive meniscus lens convex on the object side. The third lens unit $G_3$ is made up of a cemented doublet consisting of a positive meniscus lens convex on the image surface side and a double-concave lens, and the fourth lens unit $G_4$ is made up of a cemented doublet consisting of a negative meniscus lens convex on the object side and a double-convex lens. Focusing occurs as in Example 1.

Aberration diagrams of this example when focused on the object point at infinity and on a definite object point and at a telephoto ratio of −0.142 are attached thereto as FIGS. 18 and 19.

Example 6 is directed to a telephoto lens system having a focal length of 395.9 mm and an aperture ratio of 1:2.89. As can be seen from the sectional schematic of FIG. 9 showing this lens system focused on the object point at infinity, the first lens unit $G_1$ is made up of two positive lenses and a negative meniscus lens, and the third lens unit $G_3$ is made up of three lenses, i.e., a doublet consisting of a positive lens and a double-concave lens and a positive meniscus lens. This is to achieve a maximum telephoto ratio of up to about −0.26. In the rear of the fourth lens unit $G_4$ there is located one fixed lens, with a stop interposed between them. This lens may have a magnification of either a minus or a plus sign, but has no influence on the essential quality of the telephoto lens system.

The first lens unit $G_1$ consists of a double-convex lens, a positive meniscus lens convex on the object side and a negative meniscus lens convex on the object side. An air lens is interposed between the second and third lenses. It is here to be noted that anomalously partial-dispersing glasses are used for the first and second positive lenses. The second lens unit $G_2$ is made up of a positive meniscus lens heavily convex on the object side and a doublet with an air lens interposed between them, said doublet consisting of a positive meniscus lens convex on the image surface side and a double-concave lens. The third lens unit $G_3$ is made up of a doublet consisting of a positive meniscus lens convex on the image surface side and a double-concave lens and a positive meniscus lens convex on the object side, and the fourth lens unit $G_4$ consists of a cemented doublet consisting of a negative meniscus lens convex on the object side and a double-convex lens. The fixed lens located in the rear of the stop consists of a meniscus lens convex on the object side. Focusing occurs as in Example 1.

Aberration diagrams of this example when focused on the object point at infinity and on a definite object point and at a telephoto ratio of −0.261 are attached hereto as FIGS. 20 and 21.

The numerical data about each example are enumerated below. The symbols are:

$r_1, r_2, \ldots$ the radius of curvature of each lens surface $d_1, d_2, \ldots$ the separation between adjacent lens surfaces $n_{d1}, n_{d2}, \ldots$ the d-line index of refraction of each lens $v_{d1}, v_{d2}, \ldots$ the Abbe's number of each lens M . . . the image-formation magnification of the entire system

EXAMPLE 1

| | | | |
|---|---|---|---|
| $r_1 = 314.0960$ | $d_1 = 5.6467$ | $n_{d1} = 1.51633$ | $v_{d1} = 64.15$ |
| $r_2 = 1048.7373$ | $d_2 = 0.1500$ | | |
| $r_3 = 118.8670$ | $d_3 = 14.0951$ | $n_{d2} = 1.43875$ | $v_{d2} = 94.97$ |
| $r_4 = -6593.8754$ | $d_4 = 0.1500$ | | |
| $r_5 = 77.5748$ | $d_5 = 12.9173$ | $n_{d3} = 1.49700$ | $v_{d3} = 81.61$ |
| $r_6 = 235.7509$ | $d_6 = 1.9026$ | | |
| $r_7 = 241.6482$ | $d_7 = 4.4500$ | $n_{d4} = 1.83400$ | $v_{d4} = 37.16$ |
| $r_8 = 73.2837$ | $d_8 = 42.2000$ | | |
| $r_9 = 97.8095$ | $d_9 = 10.7405$ | $n_{d5} = 1.83400$ | $v_{d5} = 37.16$ |
| $r_{10} = -2064.2670$ | $d_{10} = 4.2924$ | | |
| $r_{11} = -215.9559$ | $d_{11} = 6.9192$ | $n_{d6} = 1.80518$ | $v_{d6} = 25.43$ |
| $r_{12} = -88.4628$ | $d_{12} = 5.5000$ | $n_{d7} = 1.67270$ | $v_{d7} = 32.10$ |
| $r_{13} = 125.6399$ | $d_{13} = 5.1473$ | | |
| $r_{14} = 254.9981$ | $d_{14} = 3.3036$ | $n_{d8} = 1.61340$ | $v_{d8} = 43.84$ |
| $r_{15} = 41.7484$ | $d_{15} = 8.7235$ | $n_{d9} = 1.80518$ | $v_{d9} = 25.43$ |
| $r_{16} = 58.2961$ | $d_{16} = 40.8978$ | | |
| $r_{17} = 535.6268$ | $d_{17} = 2.2400$ | $n_{d10} = 1.58144$ | $v_{d10} = 40.75$ |
| $r_{18} = 79.1612$ | $d_{18} = 6.0962$ | $n_{d11} = 1.48749$ | $v_{d11} = 70.20$ |
| $r_{19} = -115.5703$ | $d_{19} = 3.1279$ | | |
| $r_{20} = \infty$ (Stop) | | | |

| Variable spaces for focusing | | |
|---|---|---|
| | Infinity | M: −0.142× |
| $d_{13}$ | 5.147 | 25.412 |
| $d_{16}$ | 40.898 | 6.212 |
| $d_{19}$ | 3.128 | 17.550 |

EXAMPLE 2

| | | | |
|---|---|---|---|
| $r_1 = 312.4042$ | $d_1 = 7.8920$ | $n_{d1} = 1.51633$ | $v_{d1} = 64.15$ |
| $r_2 = 825.6122$ | $d_2 = 0.1000$ | | |
| $r_3 = 110.5464$ | $d_3 = 14.9803$ | $n_{d2} = 1.49700$ | $v_{d2} = 81.61$ |
| $r_4 = 2279.1648$ | $d_4 = 0.1000$ | | |
| $r_5 = 74.8491$ | $d_5 = 14.3243$ | $n_{d3} = 1.43875$ | $v_{d3} = 94.97$ |
| $r_6 = 268.9770$ | $d_6 = 0.7344$ | | |
| $r_7 = 238.9340$ | $d_7 = 4.4834$ | $n_{d4} = 1.83400$ | $v_{d4} = 37.16$ |
| $r_8 = 71.0866$ | $d_8 = 40.0674$ | | |
| $r_9 = 103.5937$ | $d_9 = 8.5500$ | $n_{d5} = 1.78590$ | $v_{d5} = 44.19$ |
| $r_{10} = 2394.1104$ | $d_{10} = 4.4291$ | | |
| $r_{11} = -199.8148$ | $d_{11} = 5.5286$ | $n_{d6} = 1.75520$ | $v_{d6} = 27.51$ |
| $r_{12} = -93.4059$ | $d_{12} = 2.6383$ | $n_{d7} = 1.63636$ | $v_{d7} = 35.37$ |
| $r_{13} = 369.0456$ | $d_{13} = 4.4483$ | | |
| $r_{14} = -1763.3040$ | $d_{14} = 5.1225$ | $n_{d8} = 1.84666$ | $v_{d8} = 23.78$ |
| $r_{15} = -177.5996$ | $d_{15} = 3.7300$ | | |
| $r_{16} = -139.0726$ | $d_{16} = 4.2000$ | $n_{d9} = 1.59551$ | $v_{d9} = 39.21$ |
| $r_{17} = 41.6594$ | $d_{17} = 4.6125$ | $n_{d10} = 1.84666$ | $v_{d10} = 23.78$ |
| $r_{18} = 57.5944$ | $d_{18} = 36.0234$ | | |
| $r_{19} = 817.4342$ | $d_{19} = 2.2448$ | $n_{d11} = 1.72342$ | $v_{d11} = 37.95$ |
| $r_{20} = 116.0636$ | $d_{20} = 6.2000$ | $n_{d12} = 1.49700$ | $v_{d12} = 81.61$ |
| $r_{21} = -88.0918$ | $d_{21} = 8.0906$ | | |
| $r_{22} = \infty$ (Stop) | | | |

| Variable spaces for focusing | | |
|---|---|---|
| | Infinity | M: −0.176× |
| $d_{13}$ | 4.448 | 25.746 |
| $d_{18}$ | 36.023 | 7.780 |
| $d_{21}$ | 8.091 | 15.037 |

EXAMPLE 3

| | | | |
|---|---|---|---|
| $r_1 = 330.4915$ | $d_1 = 7.8055$ | $n_{d1} = 1.51633$ | $v_{d1} = 64.15$ |
| $r_2 = -2171.8772$ | $d_2 = 0.1500$ | | |
| $r_3 = 117.3781$ | $d_3 = 13.5314$ | $n_{d2} = 1.43875$ | $v_{d2} = 94.97$ |
| $r_4 = 823.5721$ | $d_4 = 0.1500$ | | |
| $r_5 = 70.4418$ | $d_5 = 14.4560$ | $n_{d3} = 1.49700$ | $v_{d3} = 81.61$ |
| $r_6 = 187.1992$ | $d_6 = 2.0963$ | | |
| $r_7 = 194.7838$ | $d_7 = 4.4500$ | $n_{d4} = 1.83400$ | $v_{d4} = 37.16$ |
| $r_8 = 65.9323$ | $d_8 = 42.3002$ | | |
| $r_9 = 108.0394$ | $d_9 = 9.2327$ | $n_{d5} = 1.83400$ | $v_{d5} = 37.16$ |
| $r_{10} = 1639.0917$ | $d_{10} = 3.9449$ | | |
| $r_{11} = -336.4801$ | $d_{11} = 7.8750$ | $n_{d6} = 1.80518$ | $v_{d6} = 25.43$ |
| $r_{12} = -105.2403$ | $d_{12} = 5.5000$ | $n_{d7} = 1.66680$ | $v_{d7} = 33.04$ |
| $r_{13} = 127.0606$ | $d_{13} = 5.1812$ | | |
| $r_{14} = 286.8917$ | $d_{14} = 3.3000$ | $n_{d8} = 1.56444$ | $v_{d8} = 43.78$ |
| $r_{15} = 44.3137$ | $d_{15} = 4.2726$ | $n_{d9} = 1.84666$ | $v_{d9} = 23.88$ |
| $r_{16} = 59.2717$ | $d_{16} = 43.4635$ | | |
| $r_{17} = 261.4542$ | $d_{17} = 2.6800$ | $n_{d10} = 1.65446$ | $v_{d10} = 33.62$ |
| $r_{18} = 103.4543$ | $d_{18} = 5.1107$ | $n_{d11} = 1.48749$ | $v_{d11} = 70.20$ |
| $r_{19} = -145.2193$ | $d_{19} = 3.0000$ | | |
| $r_{20} = \infty$ (Stop) | | | |

Variable spaces for focusing

| | Infinity | M: -0.142× |
|---|---|---|
| $d_{13}$ | 5.181 | 29.898 |
| $d_{16}$ | 43.463 | 5.795 |
| $d_{19}$ | 3.000 | 15.954 |

EXAMPLE 4

| | | | |
|---|---|---|---|
| $r_1 = 316.6752$ | $d_1 = 5.9154$ | $n_{d1} = 1.51633$ | $v_{d1} = 64.15$ |
| $r_2 = 1162.5715$ | $d_2 = 0.1500$ | | |
| $r_3 = 131.2814$ | $d_3 = 13.1518$ | $n_{d2} = 1.45600$ | $v_{d2} = 90.31$ |
| $r_4 = 4223.2860$ | $d_4 = 0.1500$ | | |
| $r_5 = 75.3396$ | $d_5 = 15.9538$ | $n_{d3} = 1.43875$ | $v_{d3} = 94.97$ |
| $r_6 = 406.8124$ | $d_6 = 0.8350$ | | |
| $r_7 = 295.9497$ | $d_7 = 6.3497$ | $n_{d4} = 1.83400$ | $v_{d4} = 37.16$ |
| $r_8 = 73.0570$ | $d_8 = 23.8052$ | | |
| $r_9 = 117.8005$ | $d_9 = 8.3701$ | $n_{d5} = 1.78800$ | $v_{d5} = 47.38$ |
| $r_{10} = -4304.6528$ | $d_{10} = 4.5424$ | | |
| $r_{11} = -252.2951$ | $d_{11} = 8.0885$ | $n_{d6} = 1.60323$ | $v_{d6} = 42.32$ |
| $r_{12} = 63.6134$ | $d_{12} = 7.6030$ | $n_{d7} = 1.85026$ | $v_{d7} = 32.28$ |
| $r_{13} = 147.9511$ | $d_{13} = 6.1618$ | | |
| $r_{14} = 919.8087$ | $d_{14} = 7.0000$ | $n_{d8} = 1.84666$ | $v_{d8} = 23.78$ |
| $r_{15} = -275.5983$ | $d_{15} = 1.8500$ | | |
| $r_{16} = -869.2898$ | $d_{16} = 8.5523$ | $n_{d9} = 1.62374$ | $v_{d9} = 47.10$ |
| $r_{17} = 66.6273$ | $d_{17} = 52.3429$ | | |
| $r_{18} = 582.9273$ | $d_{18} = 4.2981$ | $n_{d10} = 1.49700$ | $v_{d10} = 81.61$ |
| $r_{19} = -87.0864$ | $d_{19} = 2.0000$ | $n_{d11} = 1.72047$ | $v_{d11} = 34.72$ |
| $r_{20} = -137.2969$ | $d_{20} = 1.3800$ | | |
| $r_{21} = \infty$ (Stop) | | | |

Variable spaces for focusing

| | Infinity | M: -0.142× |
|---|---|---|
| $d_{13}$ | 6.162 | 17.503 |
| $d_{17}$ | 52.343 | 8.710 |
| $d_{20}$ | 1.380 | 33.685 |

EXAMPLE 5

| | | | |
|---|---|---|---|
| $r_1 = 384.9058$ | $d_1 = 6.1383$ | $n_{d1} = 1.51633$ | $v_{d1} = 64.15$ |
| $r_2 = 7596.7178$ | $d_2 = 0.1500$ | | |
| $r_3 = 106.5689$ | $d_3 = 13.5577$ | $n_{d2} = 1.45600$ | $v_{d2} = 90.31$ |
| $r_4 = 505.8970$ | $d_4 = 0.1500$ | | |
| $r_5 = 76.6018$ | $d_5 = 14.7799$ | $n_{d3} = 1.43875$ | $v_{d3} = 94.97$ |
| $r_6 = 286.2687$ | $d_6 = 0.6491$ | | |
| $r_7 = 212.3390$ | $d_7 = 4.5108$ | $n_{d4} = 1.83400$ | $v_{d4} = 37.16$ |
| $r_8 = 71.9628$ | $d_8 = 45.4112$ | | |
| $r_9 = 96.9884$ | $d_9 = 8.5897$ | $n_{d5} = 1.78590$ | $v_{d5} = 44.18$ |
| $r_{10} = 7154.3707$ | $d_{10} = 7.7586$ | | |
| $r_{11} = -256.1654$ | $d_{11} = 4.2903$ | $n_{d6} = 1.61293$ | $v_{d6} = 37.00$ |
| $r_{12} = 82.0717$ | $d_{12} = 4.7230$ | $n_{d7} = 1.76180$ | $v_{d7} = 27.11$ |
| $r_{13} = 170.0372$ | $d_{13} = 6.1129$ | | |
| $r_{14} = -1352.9035$ | $d_{14} = 12.3560$ | $n_{d8} = 1.84666$ | $v_{d8} = 23.78$ |
| $r_{15} = -110.0118$ | $d_{15} = 7.0297$ | $n_{d9} = 1.62374$ | $v_{d9} = 47.10$ |
| $r_{16} = 66.2598$ | $d_{16} = 41.8153$ | | |
| $r_{17} = 330.0481$ | $d_{17} = 2.3867$ | $n_{d10} = 1.71736$ | $v_{d10} = 29.51$ |
| $r_{18} = 104.2047$ | $d_{18} = 4.9202$ | $n_{d11} = 1.49700$ | $v_{d11} = 81.61$ |
| $r_{19} = -115.3233$ | $d_{19} = 1.3800$ | | |
| $r_{20} = \infty$ (Stop) | | | |

Variable spaces for focusing

| | Infinity | M: -0.142× |
|---|---|---|
| $d_{13}$ | 6.113 | 20.092 |
| $d_{16}$ | 41.815 | 11.533 |
| $d_{19}$ | 1.380 | 17.695 |

EXAMPLE 6

| | | | |
|---|---|---|---|
| $r_1 = 145.1825$ | $d_1 = 24.3500$ | $n_{d1} = 1.49700$ | $v_{d1} = 81.61$ |
| $r_2 = -1422.1900$ | $d_2 = 0.1500$ | | |
| $r_3 = 102.4508$ | $d_3 = 20.4000$ | $n_{d2} = 1.43389$ | $v_{d2} = 95.15$ |
| $r_4 = 314.3330$ | $d_4 = 1.4658$ | | |
| $r_5 = 279.9662$ | $d_5 = 4.4500$ | $n_{d3} = 1.80100$ | $v_{d3} = 34.97$ |
| $r_6 = 95.1884$ | $d_6 = 45.0000$ | | |
| $r_7 = 136.7909$ | $d_7 = 10.5900$ | $n_{d4} = 1.83481$ | $v_{d4} = 42.72$ |
| $r_8 = 7906.3797$ | $d_8 = 7.0932$ | | |
| $r_9 = -211.6503$ | $d_9 = 6.9100$ | $n_{d5} = 1.76200$ | $v_{d5} = 40.10$ |
| $r_{10} = -122.5895$ | $d_{10} = 5.5000$ | $n_{d6} = 1.61340$ | $v_{d6} = 43.84$ |
| $r_{11} = 471.2484$ | $d_{11} = 11.2297$ | | |
| $r_{12} = -582.8478$ | $d_{12} = 5.2500$ | $n_{d7} = 1.84666$ | $v_{d7} = 23.78$ |
| $r_{13} = -244.9139$ | $d_{13} = 5.0800$ | $n_{d8} = 1.61340$ | $v_{d8} = 43.84$ |
| $r_{14} = 62.3755$ | $d_{14} = 0.5614$ | | |
| $r_{15} = 63.4092$ | $d_{15} = 7.5000$ | $n_{d9} = 1.84666$ | $v_{d9} = 23.88$ |
| $r_{16} = 90.9730$ | $d_{16} = 66.2129$ | | |
| $r_{17} = 730.6931$ | $d_{17} = 2.6800$ | $n_{d10} = 1.72047$ | $v_{d10} = 34.72$ |
| $r_{18} = 148.9055$ | $d_{18} = 9.1000$ | $n_{d11} = 1.49700$ | $v_{d11} = 81.61$ |
| $r_{19} = -125.5099$ | $d_{19} = 11.0858$ | | |
| $r_{20} = \infty$ (Stop) | $d_{20} = 5.0000$ | | |
| $r_{21} = 36.5192$ | $d_{21} = 3.4500$ | $n_{d12} = 1.67650$ | $v_{d12} = 37.54$ |
| $r_{22} = 34.5733$ | | | |

Variable spaces for focusing

| | Infinity | M: -0.261× |
|---|---|---|
| $d_{11}$ | 11.230 | 49.688 |
| $d_{16}$ | 66.213 | 13.091 |
| $d_{19}$ | 11.086 | 25.757 |

The values of conditions (1) to (4) in each example are shown in Table 6, and the values of $\beta_3$, $\beta_{3MOD}$, $\beta_4$ and $\beta_{4MOD}$ in conditions (5) and (6) as well as the values of conditions (7) to (9) are shown in Table 7.

TABLE 6

| Example | (1) | (2) | (3) | (4) |
|---|---|---|---|---|
| 1 | 0.7653 | 0.1975 | 0.6528 | 1.4051 |
| 2 | 1.1159 | 0.2157 | 0.5573 | 3.0622 |
| 3 | 0.4938 | 0.1841 | 0.7497 | 1.6763 |
| 4 | 1.258 | 0.1174 | 0.6072 | 0.3507 |
| 5 | 1.301 | 0.2457 | 0.546 | 0.8561 |
| 6 | 1.183 | 0.1874 | 0.5592 | 2.6209 |

TABLE 7

| Ex. | $\beta_3$ | $\beta_{3MOD}$ | $\beta_4$ | $\beta_{4MOD}$ | (7) | (8) | (9) |
|---|---|---|---|---|---|---|---|
| 1 | 2.592 | 2.7363 | 0.5334 | 0.4736 | 0.8618 | 0.1325 | 6.67 |
| 2 | 4.8655 | 4.9565 | 0.4604 | 0.4284 | 0.5838 | 0.1188 | 7.86 |
| 3 | 2.4976 | 2.5935 | 0.5149 | 0.4601 | 0.8831 | 0.1384 | 7.61 |
| 4 | 2.3732 | 2.7521 | 0.6054 | 0.4911 | 0.6176 | 0.2470 | 10.04 |
| 5 | 2.8824 | 3.1027 | 0.5467 | 0.4804 | 0.6356 | 0.1489 | 9.89 |
| 6 | 3.7504 | 3.9556 | 0.4382 | 0.3876 | 0.6168 | 0.1486 | 3.74 |

According to the present invention as can be understood from the foregoing description, the performance or quality of the entire system can be improved by the occurrence of high-order aberrations in the first lens unit $G_1$. In this case, the amount of residual high-order aberrations can be extremely reduced by separate provision of high-order aberration-producing surfaces in the second lens unit $G_2$, as described in the examples. Even when the image-formation quality on the object point at infinity can be upgraded, variations of aberrations inclusive of spherical aberration can be reduced by the second lens unit $G_2$. In addition, stable performance or quality can be achieved by the movement of the third and fourth lens units $G_3$ and $G_4$. A chromatic aberration variation, too, can be reduced by the combined negative and positive lenses of the second lens unit $G_2$. Thus, the focusing lenses, for instance, may be constructed from a doublet that can compensate for the chromatic aberration by itself.

What is claimed is:

1. A telephoto lens system comprising, in order from an object to an image side:

a first lens unit of positive refracting power;

a second lens unit of positive refracting power;

a third lens unit of negative refracting power; and a fourth lens unit of positive refracting power, said first lens unit comprising, in order from said object side, two positive lenses and a negative meniscus lens having a concave surface with a strong curvature on said image surface side, said second lens unit comprising a positive lens having a convex surface with a strong curvature on said object side and a doublet consisting of negative and positive lenses, said third lens unit comprising a doublet consisting of negative and positive lenses, and said fourth lens unit comprising a cemented doublet consisting of negative and positive lenses, wherein said third and fourth lens units are movably attached for focusing, and said first and second lens units remain fixed and further conform to the following four conditions (1) to (4):

$$0.3 < f_1/f_2 < 1.5 \qquad (1)$$

$$0.1 < D_1/f_{12} < 0.55 \qquad (2)$$

$$0.15 < -f_3/f_4 < 1.0 \qquad (3)$$

$$0.3 < -\Delta X_3/\Delta X_4 < 3.1 \qquad (4)$$

where:

$f_1$ is the focal length of the first lens unit, $f_2$ is the focal length of the second lens unit, $f_3$ is the focal length of the third lens unit, $f_4$ is the focal length of the fourth lens unit, $f_{12}$ is the composite focal length of the first and second lens units on the object point at infinity, $\Delta X_3$ is the amount of focusing movement of the third lens unit from the object point at infinity to the shortest object distance with the proviso that a plus sign indicates the movement of the third lens unit from the reference position on the object point at infinity to the image surface side, $\Delta X_4$ is the amount of focusing movement of the fourth lens unit from the object point at infinity to the shortest object distance with the proviso that a plus sign indicates the movement of the fourth lens unit from the reference position on the object point at infinity to the image surface side, and $D_1$ is the real separation between the first and second lens units.

2. The telephoto lens system according to claim 1, which further conforms to the following condition (5):

$$|\beta_3| < |\beta_{3MOD}| \qquad (5)$$

where:

$\beta_3$ is the paraxial lateral magnification of the third lens unit on the object point at infinity, and $\beta_{3MOD}$ is the paraxial lateral magnification of the third lens unit at the shortest object distance.

3. The telephoto lens system according to claim 1 or 2, which further conforms to the following condition (6):

$$|\beta_4| > |\beta_{4MOD}| \qquad (6)$$

where:

$\beta_4$ is the paraxial lateral magnification of the fourth lens unit on the object point at infinity, and $\beta_{4MOD}$ is the paraxial lateral magnification of the fourth lens unit at the shortest object distance.

4. The telephoto lens system according to any one of claims 1 or 2, wherein said second lens unit comprises a front group of positive refracting power and a rear group of negative refracting power and conforms to the following condition (7):

$$0.2 < -f_{21}/f_{22} < 1.8 \qquad (7)$$

where $f_{21}$ is the focal length of the front group $G_{21}$ of the second lens unit and $f_{22}$ is the focal length of the rear group $G_{22}$ of the second lens unit.

5. The telephoto lens system according to claim 4, which further conforms to the following condition (8):

$$0.1 < |N_n - N_p| < 0.35 \qquad (8)$$

where $N_n$ is the refractive index of the negative lens in the rear group $G_{22}$ of the second lens unit and $N_p$ is the refractive index of the positive lens in the rear group $G_{22}$ of the second lens unit, both for dominant wavelength.

6. The telephoto lens system according to claim 4, which further conforms to the following condition (9):

$$2 < |\nu_n - \nu_p| < 35 \qquad (9)$$

where $\nu_n$ is the Abbe's number of the negative lens in the rear group $G_{22}$ of the second lens unit, and $\nu_p$ is the Abbe's number of the positive lens in the rear group $G_{22}$ of the second lens unit, both for dominant wavelength.

7. The telephoto lens system according to claim 5, which further conforms to the following condition (9):

$$2 < |\nu_n - \nu_p| < 35 \qquad (9)$$

where $\nu_n$ is the Abbe's number of the negative lens in the rear group $G_{22}$ of the second lens unit, and $\nu_p$ is the Abbe's number of the positive lens in the rear group $G_{22}$ of the second lens unit, both for dominant wavelength.

8. The telephoto lens system according to claim 3, wherein said second lens unit comprises a front group of positive refracting power and a rear group of negative refracting power and conforms to the following condition (7):

$$0.2 < -f_{21}/f_{22} < 1.8 \qquad (7)$$

wherein $f_{21}$ is the focal length of the front group $G_{21}$ of the second lens unit and $f_{22}$ is the focal length of the rear group $G_{22}$ of the second lens unit.

9. A telephoto lens system according to claim 1, wherein said third lens unit and said fourth lens unit are movably attached, said third lens unit being movable in a direction from said object to said image side, and said fourth lens unit being movable in an opposite direction from said image to said object side to focus from an infinite object point to a finite object point.

* * * * *